(12) United States Patent
Xu et al.

(10) Patent No.: US 10,983,624 B2
(45) Date of Patent: Apr. 20, 2021

(54) MAN-MACHINE INTERACTION METHOD, DEVICE, AND GRAPHICAL USER INTERFACE FOR ACTIVATING A DEFAULT SHORTCUT FUNCTION ACCORDING TO PRESSURE INPUT

(71) Applicant: Huawei Technologies Co., Ltd., Shenzhen (CN)

(72) Inventors: Jie Xu, Shanghai (CN); Bongwon Lee, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/085,491

(22) PCT Filed: Mar. 15, 2016

(86) PCT No.: PCT/CN2016/076337
§ 371 (c)(1),
(2) Date: Sep. 14, 2018

(87) PCT Pub. No.: WO2017/156697
PCT Pub. Date: Sep. 21, 2017

(65) Prior Publication Data
US 2019/0114067 A1 Apr. 18, 2019

(51) Int. Cl.
*G06F 3/041* (2006.01)
*G06F 3/0481* (2013.01)
(Continued)

(52) U.S. Cl.
CPC .......... *G06F 3/0414* (2013.01); *G06F 3/0482* (2013.01); *G06F 3/0488* (2013.01);
(Continued)

(58) Field of Classification Search
CPC ...... G06F 3/048; G06F 3/04817; G06F 3/041; G06F 2203/00; G06F 3/016
See application file for complete search history.

(56) References Cited

U.S. PATENT DOCUMENTS

| 5,799,292 A * | 8/1998 | Hekmatpour ......... G06F 3/0481 706/11 |
| 9,575,591 B2 | 2/2017 | Yang et al. |

(Continued)

FOREIGN PATENT DOCUMENTS

| AU | 2015101188 A4 | 10/2015 |
| CN | 101739205 A | 6/2010 |

(Continued)

OTHER PUBLICATIONS

Yutaka et al.,"[3D Touch] You will be also perhaps astonished by the new dimensional usability", Mac Fan, Oct. 10, 2015, vol. 23, No. 11, 4 pages, Mynavi Publishing, Japan.

*Primary Examiner* — Jennifer N To
*Assistant Examiner* — Qi Wan
(74) *Attorney, Agent, or Firm* — Slater Matsil, LLP

(57) ABSTRACT

Embodiments disclose a man-machine interaction method, a device, and a graphical user interface. The method includes: displaying, by an electronic device, at least one icon on a display, where at least one shortcut function is preset for a first software program marked by a first icon of the at least one icon; detecting, by the electronic device on a pressure-sensitive surface, first pressure input exerted on the first icon; determining, by the electronic device, information about the at least one shortcut function when determining that the first pressure input meets a first preset condition; continuing, by the electronic device after detecting the first pressure input, to detect second pressure input exerted on the first icon; and activating a default shortcut function of the at (Continued)

least one shortcut function when the electronic device determines that second pressure input meets a second preset condition.

21 Claims, 8 Drawing Sheets

(51) Int. Cl.
    *G06F 3/0488*     (2013.01)
    *G06F 3/0482*     (2013.01)
    *G06F 3/0484*     (2013.01)

(52) U.S. Cl.
    CPC ...... *G06F 3/04817* (2013.01); *G06F 3/04842* (2013.01); *G06F 3/04883* (2013.01); *G06F 2203/04808* (2013.01)

(56) References Cited

U.S. PATENT DOCUMENTS

| | | | |
|---|---|---|---|
| 2006/0007174 A1* | 1/2006 | Shen | G06F 3/04855 345/173 |
| 2009/0046110 A1 | 2/2009 | Sadler et al. | |
| 2010/0017710 A1 | 1/2010 | Kim et al. | |
| 2010/0060605 A1 | 3/2010 | Rimas-Ribikauskas et al. | |
| 2010/0123664 A1 | 5/2010 | Shin et al. | |
| 2010/0162182 A1* | 6/2010 | Oh | G06F 3/04883 715/863 |
| 2010/0328242 A1* | 12/2010 | Paleczny | G06F 3/016 345/173 |
| 2012/0105367 A1 | 5/2012 | Son et al. | |
| 2012/0194445 A1* | 8/2012 | Chang | G06F 3/0488 345/173 |
| 2012/0308204 A1 | 12/2012 | Hwang | |
| 2014/0009441 A1 | 1/2014 | Bernstein et al. | |
| 2014/0139472 A1* | 5/2014 | Takenaka | G06F 3/0488 345/173 |
| 2015/0058723 A1 | 2/2015 | Cieplinski et al. | |
| 2015/0062052 A1* | 3/2015 | Bernstein | G06F 3/0416 345/173 |
| 2015/0062079 A1 | 3/2015 | Shih et al. | |
| 2015/0067513 A1* | 3/2015 | Zambetti | G06F 3/0482 715/716 |
| 2015/0149964 A1* | 5/2015 | Bernstein | G06F 3/04815 715/836 |
| 2015/0370402 A1 | 12/2015 | Checkley et al. | |
| 2015/0378519 A1 | 12/2015 | Brown et al. | |
| 2016/0117141 A1* | 4/2016 | Ro | G06F 3/1454 715/748 |
| 2016/0259413 A1* | 9/2016 | Anzures | G06F 3/04817 |
| 2016/0259496 A1* | 9/2016 | Butcher | G06F 3/0488 |
| 2016/0259497 A1 | 9/2016 | Foss et al. | |
| 2016/0274686 A1 | 9/2016 | Alonso Ruiz et al. | |
| 2017/0046024 A1* | 2/2017 | Dascola | G06F 3/016 |
| 2017/0212673 A1 | 7/2017 | Bernstein et al. | |
| 2017/0308260 A1 | 10/2017 | Li | |
| 2018/0081493 A1 | 3/2018 | Wang et al. | |
| 2018/0188885 A1 | 7/2018 | Luo et al. | |
| 2019/0354223 A1 | 11/2019 | Kim et al. | |

FOREIGN PATENT DOCUMENTS

| | | |
|---|---|---|
| CN | 103118166 A | 5/2013 |
| CN | 103513882 A | 1/2014 |
| CN | 103713809 A | 4/2014 |
| CN | 104007847 A | 8/2014 |
| CN | 104049759 A | 9/2014 |
| CN | 104714741 A | 6/2015 |
| CN | 104820566 A | 8/2015 |
| CN | 105045454 A | 11/2015 |
| CN | 105045514 A | 11/2015 |
| CN | 105159530 A | 12/2015 |
| CN | 105159547 A | 12/2015 |
| CN | 105183284 A | 12/2015 |
| CN | 105183349 A | 12/2015 |
| CN | 104063164 B | 2/2018 |
| JP | 2006185443 A | 7/2006 |
| JP | 2008140182 A | 6/2008 |
| JP | 2010118060 A | 5/2010 |
| JP | 2014134867 A | 7/2014 |
| JP | 2015519655 A | 7/2015 |
| JP | 2015521315 A | 7/2015 |
| JP | 2017516163 A | 6/2017 |
| KR | 20100009986 A | 1/2010 |
| KR | 20120133365 A | 12/2012 |
| KR | 20150111651 | 10/2015 |
| WO | 2014018732 A2 | 1/2014 |
| WO | 2014146443 A1 | 9/2014 |

* cited by examiner

200

```
┌─────────────────────────────────────┐
│ An electronic device displays at least one icon on │
│ a display, where at least one shortcut function is │     S210
│ preset for a first software program marked by a    │
│ first icon of the at least one icon                │
└─────────────────────────────────────┘
                    │
┌─────────────────────────────────────┐
│ The electronic device detects, on a pressure-      │
│ sensitive surface, first pressure input exerted on │     S220
│ the first icon                                     │
└─────────────────────────────────────┘
                    │
┌─────────────────────────────────────┐
│ The electronic device determines information       │
│ about the at least one shortcut function when      │     S230
│ determining that the first pressure input meets a  │
│ first preset condition                             │
└─────────────────────────────────────┘
                    │
┌─────────────────────────────────────┐
│ Activate a default shortcut function of the at least│
│ one shortcut function when the electronic device   │     S240
│ determines that second pressure input meets a      │
│ second preset condition                            │
└─────────────────────────────────────┘
```

FIG. 3

MAN-MACHINE INTERACTION METHOD, DEVICE, AND GRAPHICAL USER INTERFACE FOR ACTIVATING A DEFAULT SHORTCUT FUNCTION ACCORDING TO PRESSURE INPUT

CROSS-REFERENCE TO RELATED APPLICATIONS

This application is a national stage of International Application No. PCT/CN2016/076337 filed on Mar. 15, 2016, which is hereby incorporated by reference in its entirety.

TECHNICAL FIELD

Embodiments of the present invention relate to the communications field, and in particular, to a man-machine interaction method, a device, and a graphical user interface.

BACKGROUND

As a pressure recognition technology supported by displays becomes mature gradually, and the displays have characteristics such as convenient use and good experience, an increasing quantity of electronic devices such as a mobile phone and a tablet computer can support the pressure recognition technology. There are diverse user gestures in an actual operation process. For example, user gestures such as long press, tap, and slide all indicate particular user operation behaviors. If a user operation behavior is recognized by detecting a pressure value of a user gesture, great convenience may be brought to a user.

A user needs to preset a user operation path before performing a pressure touch operation on a display. For example, a secondary selection needs to be performed on a small window (a function list interface) that pops up after the pressure touch operation, that is, a touch selection needs to be performed among multiple shortcut functions displayed within the small window, to activate a selected shortcut function. Performing a touch selection in a relatively small window is likely to cause a misoperation, resulting in relatively poor user experience.

SUMMARY

Embodiments of the present invention provide a method for man-machine interaction on an electronic device, a device, and a graphical user interface, to reduce a misoperation and improve user experience.

According to a first aspect, a man-machine interaction method is provided and applied to an electronic device having a display and a pressure-sensitive surface, where the electronic device includes one or more sensors that detect strength of a touch on the pressure-sensitive surface; and the method includes: displaying, by the electronic device, at least one icon on the display, where at least one shortcut function is preset for a first software program marked by a first icon of the at least one icon; detecting, by the electronic device on the pressure-sensitive surface, first pressure input exerted on the first icon; determining, by the electronic device, information about the at least one shortcut function when determining that the first pressure input meets a first preset condition; continuing, by the electronic device after detecting the first pressure input, to detect second pressure input exerted on the first icon; and activating a default shortcut function of the at least one shortcut function when the electronic device determines that the second pressure input meets a second preset condition.

In this way, when a user needs to implement a shortcut function, instead of selecting the first icon and then selecting the shortcut function, the user performs selection for only one time to implement the default shortcut function of the at least one shortcut function. This can avoid a misoperation caused during multiple selections, can further increase a speed of enabling the default shortcut function, and therefore, can improve user experience.

In a first possible implementation of the first aspect, the determining, by the electronic device, information about the at least one shortcut function when determining that the first pressure input meets a first preset condition includes: determining the information about the at least one shortcut function when the electronic device determines that a pressure value of the first pressure input reaches a first threshold within a first preset time period, where the first preset time period is a time interval between a first time point and a second time point, and the first time point is a time at which the electronic device starts to detect the pressure value of the first pressure input exerted on the first icon.

With reference to the foregoing possible implementation of the first aspect, in a second possible implementation of the first aspect, the determining, by the electronic device, information about the at least one shortcut function when determining that the first pressure input meets a first preset condition includes: determining the information about the at least one shortcut function when the electronic device determines that a pressure value of the first pressure input falls within a range from a third threshold to a first threshold for at least two times within a first preset time period, where the first preset time period is a time interval between a first time point and a second time point, the first time point is a time at which the electronic device starts to detect the pressure value of the first pressure input exerted on the first icon, and the first threshold is greater than the third threshold.

In this way, the electronic device may determine the information about the at least one shortcut function when a gesture pressure value falls within the range from the third threshold to the first threshold for at least two times within the particular first preset time period, so that the electronic device determines a relationship between a pressure value of the second pressure input and a second preset condition to activate the default shortcut function of the at least one shortcut function.

With reference to the foregoing possible implementations of the first aspect, in a third possible implementation of the first aspect, the activating a default shortcut function of the at least one shortcut function when the electronic device determines that the second pressure input meets a second preset condition includes: activating the default shortcut function of the at least one shortcut function when the electronic device detects that a pressure value of the second pressure input reaches a second threshold within the first preset time period, where the second threshold is greater than the first threshold.

With reference to the foregoing possible implementation of the first aspect, in a fourth possible implementation of the first aspect, the activating the default shortcut function of the at least one shortcut function when the electronic device detects that a pressure value of the second pressure input reaches a second threshold within the first preset time period includes: continuing, by the electronic device when the electronic device detects that the pressure value of the second pressure input reaches the second threshold within the first preset time period, to detect the pressure value of the second pressure input exerted on the first icon within a second preset time period; and activating the default shortcut function of the at least one shortcut function when the electronic device determines that the detected pressure value of the second pressure input is always greater than or equal to the second threshold within the second preset time period, where the second preset time period is a time interval between a third time point and a fourth time point, and the third time point is a time at which the pressure value of the second pressure input reaches the second threshold.

Therefore, when the pressure value of the second pressure input can reach the second threshold within the given first preset time period, the default shortcut function may be not activated instantly because a user may perform a misoperation in a press process, for example, an accidental tap may cause the pressure value of the second pressure input on the first icon to reach the second threshold. Determining is performed again in the second preset time period to determine, after the pressure value of the second pressure input reaches the second threshold, whether the pressure value of the second pressure input remains greater than or equal to the second threshold for the second preset time period. If the pressure value of the second pressure input remains for the second preset time period, the electronic device determines that the user needs to enable the default shortcut function, and the electronic device activates the default shortcut function.

With reference to the foregoing possible implementations of the first aspect, in a fifth possible implementation of the first aspect, the activating a default shortcut function of the at least one shortcut function when the electronic device determines that the second pressure input meets a second preset condition includes: activating the default shortcut function of the at least one shortcut function when the electronic device detects that a pressure value of the second pressure input reaches a fourth threshold, where the fourth threshold is greater than the first threshold.

With reference to the foregoing possible implementation of the first aspect, in a sixth possible implementation of the first aspect, the activating the default shortcut function of the at least one shortcut function when the electronic device detects that a pressure value of the second pressure input reaches a second threshold within the first preset time period includes: when the electronic device detects that the pressure value of the second pressure input is greater than or equal to a fifth threshold and less than the fourth threshold, determining, by the electronic device, whether the pressure value of the second pressure input exerted on the first icon is always greater than or equal to the fifth threshold and less than the fourth threshold within a subsequent third preset time period; and activating the default shortcut function of the at least one shortcut function if the pressure value of the second pressure input exerted on the first icon is always greater than or equal to the fifth threshold and less than the fourth threshold within the third preset time period, where the fourth threshold is greater than the fifth threshold, the third preset time period is a time interval between a fifth time point and a sixth time point, and the fifth time point is a time at which the pressure value of the second pressure input reaches the fifth threshold.

In an actual application process, there is a relatively great difference between different press behaviors of different users, that is, it may be easy for finger pressure values of some users to reach the specified fourth threshold, but it may be difficult for finger pressure values of some users to reach the specified fourth threshold. Therefore, when the electronic device detects that the pressure value of the second pressure input of the user does not reach the fourth threshold, but reach the preset fifth threshold, the electronic device detects, in a third preset time period, whether the pressure value of the second pressure input of the user that reaches the fifth threshold remains for the third preset time period, and after the electronic device determines that the pressure value of the second pressure input remains for the preset third preset time period, the electronic device determines that the user needs to operate the default shortcut function, and the electronic device activates the default shortcut function. A value obtained by subtracting the fifth threshold by the fourth threshold may be considered as a compensation for the pressure value.

With reference to the foregoing possible implementations of the first aspect, in a seventh possible implementation of the first aspect, the activating a default shortcut function of the at least one shortcut function when the electronic device determines that the second pressure input meets a second preset condition includes: activating the default shortcut function of the at least one shortcut function when the electronic device determines that a pressure value of the second pressure input falls within a range from the third threshold to the first threshold for at least two times and that a time interval between the at least two times meets a preset dual-pressure time condition, where the first threshold is greater than the third threshold, the preset dual-pressure time condition may be, for example, that the time interval between the at least two times is within a fifth preset time period, and the fifth preset time period may be between a time point at which the second pressure input starts and a time point at which the second pressure input ends.

With reference to the foregoing possible implementations of the first aspect, in an eighth possible implementation of the first aspect, the activating a default shortcut function of the at least one shortcut function when the electronic device determines that the second pressure input meets a second preset condition includes: continuing, by the electronic device, to detect the pressure value of the second pressure input when the electronic device determines that the pressure value of the second pressure input is less than a sixth threshold; and activating the default function of the at least one shortcut function when the electronic device determines that the pressure value of the second pressure input reaches a seventh threshold, where the sixth threshold is less than the first threshold, and the seventh threshold is greater than the first threshold.

With reference to the foregoing possible implementation of the first aspect, in a ninth possible implementation of the first aspect, the determining, by the electronic device, information about the at least one shortcut function when determining that the first pressure input meets a first preset condition includes: determining, by the electronic device, whether a pressure value of the first pressure input is greater than or equal to a second threshold, and determining the information about the at least one shortcut function if the pressure value of the first pressure input is greater than or equal to the second threshold; and the activating a default shortcut function of the at least one shortcut function when the electronic device determines that the second pressure input meets a second preset condition includes: determining, by the electronic device, whether a pressure value of the second pressure input is always greater than or equal to the second threshold within a fourth preset time period, and activating the default shortcut function of the at least one shortcut function if the pressure value of the second pressure input exerted on the first icon is always greater than or equal to the second threshold within the fourth preset time period, where the fourth preset time period is a time interval between a seventh time point and an eighth time point, and the seventh time point is a time at which the pressure value of the second pressure input reaches the second threshold.

With reference to the foregoing possible implementations of the first aspect, in a tenth possible implementation of the first aspect, after the determining, by the electronic device, information about the at least one shortcut function when determining that the first pressure input meets a first preset condition, the method further includes: displaying, by the electronic device, information about each of the at least one shortcut function on the display, with displaying a mark for information about the default shortcut function, so that display of the information about the default shortcut function is different from display of information about another shortcut function.

With reference to the foregoing possible implementation of the first aspect, in an eleventh possible implementation of the first aspect, the displaying a mark for information about the default shortcut function includes: adding, by the electronic device, a marking icon only to the information about the default shortcut function; and after the displaying, by the electronic device, information about each of the at least one shortcut function on the display, the method further includes: when the electronic device detects that a user changes a location of the marking icon, determining a shortcut function corresponding to a changed location of the marking icon as the default shortcut function.

Therefore, the information about the at least one shortcut function is displayed on the display, so that a shortcut function list is presented to the user intuitively. In addition, a default shortcut function is marked by using a marking icon, so that the user changes an icon location according to a requirement to determine a new default shortcut function. In this way, a favorite shortcut function, a frequently used shortcut function, and the like can be selected flexibly.

According to a second aspect, an electronic device is provided, where the electronic device includes a display, a pressure-sensitive surface, a sensor, and a processor, and at least one icon is displayed on the display, where at least one shortcut function is preset for a first software program marked by a first icon of the at least one icon; the sensor is further configured to detect, on the pressure-sensitive surface, first pressure input exerted on the first icon; the processor is configured to determine information about the at least one shortcut function when determining that the first pressure input meets a first preset condition; the sensor is configured to continue to detect, after detecting the first pressure input, second pressure input exerted on the first icon; and the processor is further configured to activate a default shortcut function of the at least one shortcut function when determining that the second pressure input meets a second preset condition.

In a first possible implementation of the second aspect, the processor is specifically configured to determine the information about the at least one shortcut function when a pressure value of the first pressure input reaches a first threshold within a first preset time period, where the first preset time period is a time interval between a first time point and a second time point, and the first time point is a time at which the sensor starts to detect the pressure value of the first pressure input exerted on the first icon.

With reference to the foregoing possible implementation of the second aspect, in a second possible implementation of the second aspect, the processor is further specifically configured to determine the information about the at least one shortcut function when determining that a pressure value of the first pressure input falls within a range from a third threshold to a first threshold for at least two times within a first preset time period, where the first preset time period is a time interval between a first time point and a second time point, the first time point is a time at which the sensor starts to detect the pressure value of the first pressure input exerted on the first icon, and the first threshold is greater than the third threshold.

With reference to the foregoing possible implementations of the second aspect, in a third possible implementation of the second aspect, the processor is further specifically configured to activate the default shortcut function of the at least one shortcut function when the sensor detects that a pressure value of the second pressure input reaches a second threshold within the first preset time period, where the second threshold is greater than the first threshold.

With reference to the foregoing possible implementation of the second aspect, in a fourth possible implementation of the second aspect, the sensor is further configured to: when the sensor detects that the pressure value of the second pressure input reaches the second threshold within the first preset time period, the sensor continues to detect the pressure value of the second pressure input exerted on the first icon within a second preset time period; and the processor is specifically configured to activate the default shortcut function of the at least one shortcut function when determining that the detected pressure value of the second pressure input is always greater than or equal to the second threshold within the second preset time period, where the second preset time period is a time interval between a third time point and a fourth time point, and the third time point is a time at which the pressure value of the second pressure input reaches the second threshold.

With reference to the foregoing possible implementations of the second aspect, in a fifth possible implementation of the second aspect, the processor is further specifically configured to activate the default shortcut function of the at least one shortcut function when detecting that the pressure value of the second pressure input reaches a fourth threshold, where the fourth threshold is greater than the first threshold.

With reference to the foregoing possible implementation of the second aspect, in a sixth possible implementation of the second aspect, the processor is further specifically configured to: when detecting that the pressure value of the second pressure input is greater than or equal to a fifth threshold and less than the fourth threshold, determine whether the pressure value of the second pressure input exerted on the first icon is always greater than or equal to the fifth threshold and less than the fourth threshold within a subsequent third preset time period; and activate the default shortcut function of the at least one shortcut function if the pressure value of the second pressure input exerted on the first icon is always greater than or equal to the fifth threshold and less than the fourth threshold within the third preset time period, where the fourth threshold is greater than the fifth threshold.

With reference to the foregoing possible implementations of the second aspect, in a seventh possible implementation of the second aspect, the processor is further specifically configured to: activate the default shortcut function of the at least one shortcut function when the electronic device determines that a pressure value of the second pressure input falls within a range from the third threshold to the first threshold for at least two times and that a time interval between the at least two times meets a preset dual-pressure time condition, where the first threshold is greater than the third threshold.

With reference to the foregoing possible implementations of the second aspect, in an eighth possible implementation of the second aspect, the sensor is further configured to continue to detect the pressure value of the second pressure input when it is determined that the pressure value of the second pressure input is less than a sixth threshold; and the processor is further specifically configured to activate the default function of the at least one shortcut function when determining that the pressure value of the second pressure input reaches a seventh threshold, where the sixth threshold is less than the first threshold, and the seventh threshold is greater than the first threshold.

With reference to the foregoing possible implementation of the second aspect, in a ninth possible implementation of the second aspect, the processor is further configured to: determine whether a pressure value of the first pressure input is greater than or equal to a second threshold, and determine the information about the at least one shortcut function if the pressure value of the first pressure input is greater than or equal to the second threshold; and determine whether a pressure value of the second pressure input is always greater than or equal to the second threshold within a fourth preset time period, and activate the default shortcut function of the at least one shortcut function if the pressure value of the second pressure input exerted on the first icon is always greater than or equal to the second threshold within the fourth preset time period.

With reference to the foregoing possible implementations of the second aspect, in a tenth possible implementation of the second aspect, the processor is further configured to: after determining the information about the at least one shortcut function when determining that the first pressure input meets a first preset condition, display information about each of the at least one shortcut function on the display, with displaying a mark for information about the default shortcut function, so that display of the information about the default shortcut function is different from display of information about another shortcut function.

With reference to the foregoing possible implementation of the second aspect, in an eleventh possible implementation of the second aspect, the processor is further configured to: add a marking icon only to the information about the default shortcut function; and after the information about each of the at least one shortcut function is displayed on the display, when the sensor detects that a user changes a location of the marking icon, determine a shortcut function corresponding to a changed location of the marking icon as the default shortcut function.

According to a third aspect, a graphical user interface on an electronic device is provided, where the electronic device has a display, a pressure-sensitive surface, a memory, one or more sensors configured to detect strength of a touch with the pressure-sensitive surface, and one or more processors configured to execute one or more programs stored in the memory, the graphical user interface includes at least one icon, at least one shortcut function is preset for a first software program marked by a first icon of the at least one icon, so as to: respond to first pressure input detected on the pressure-sensitive surface, where for the first pressure input, when strength of a contact corresponding to the first icon increases to meet a first preset condition, the at least one shortcut function preset for the first icon is displayed; and respond to second pressure input that is after the first pressure input is detected on the pressure-sensitive surface, where for the second pressure input, when the strength of the contact corresponding to the first icon meets a second preset condition, an interface corresponding to a default shortcut function of the at least one shortcut function is displayed.

In the foregoing possible implementations of the first aspect, the second aspect, and the third aspect, the first icon may be an application (Application, "APP" for short) icon, or may be a file icon.

According to a fourth aspect, a computer readable medium is provided, and is configured to store a computer program, where the computer program includes an instruction used to execute the method in the first aspect or any possible implementation of the first aspect.

BRIEF DESCRIPTION OF THE DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

FIG. 3 is a schematic diagram of a man-machine interaction method according to an embodiment of the present invention;

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Technical solutions in the embodiments of the present invention may be applied to all electronic devices having a display. For example, an electronic device may be a mobile telephone, a tablet personal computer (Tablet Personal Computer), a media player, a smart television, a laptop computer (Laptop Computer), a personal digital assistant (personal digital assistant, PDA), a personal computer (Personal Computer), a mobile Internet device (Mobile Internet Device), or a wearable device (Wearable Device) such as a smartwatch having a display. This is not limited in this embodiment of the present invention.

Figure 1:
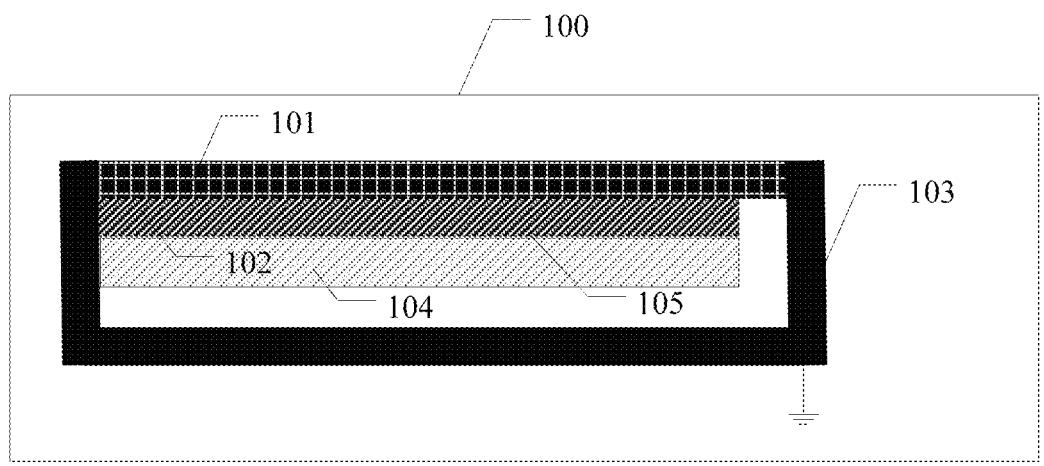
FIG. 1 is a schematic diagram of an internal structure of a display that implements a pressure touch.

FIG. 1 is a schematic diagram of an internal structure of a display that implements a pressure touch, that is, a schematic structural diagram of a pressure sensing touch display formed by combining a sensor and a touch-sensitive display. Certainly, the present invention may alternatively be implemented by using a pressure sensing display, that is, a display that has only a pressure sensing function but does not have a touch sensing function. In addition, besides a structure in which a pressure sensing function is integrated onto a display, a structure in which pressure sensing is not physically integrated onto a display may alternatively be used in the present invention, for example, a pressure plate is used to implement pressure sensing and input. Certainly, touch sensing may not be physically integrated onto the display, for example, a touchpad is used to implement touch pressure sensing and input. The following describes an embodiment of the present invention by using a pressure sensing touch display as an example. A display of another structure can implement a same function, and details are not described. As shown in FIG. 1, a display 100 of an electronic device includes a cover 101, a displaying module 102, a metal middle frame 103, and a conductive layer 104. The displaying module 102 is located between the cover 101 and the metal middle frame 103. The middle frame 103 is grounded. The conductive layer 104 is attached to a lower surface 105 of the displaying module 102. As shown in FIG. 1, in a vertical direction from the top of the electronic device to the bottom of the electronic device, an upper surface of the displaying module 102 is attached to the cover 101, and the conductive layer 104 is attached to the lower surface of the displaying module 102.

The cover 101 is a cover glass (Cover Glass). The cover glass is also referred to as a display cover and is configured to enclose or cover a component of the displaying module of the electronic device. The cover is mainly made of glass. A thickness of the cover ranges from 0.1 millimeter to 1.1 millimeters. Certainly, the cover may alternatively be made of another material. This is not limited in this embodiment of the present invention.

The displaying module 102 is one of main components that form a finished display, and mainly includes a backlight unit, a baseplate, a drive circuit, a resistor, a capacitor, and a plastic suite.

The metal middle frame 103 is a component configured to carry a part such as the displaying module, and is made of a metal material, for example, an aluminum metal middle frame.

As shown in FIG. 1, at least one capacitor is formed between the conductive layer 104 and the metal middle frame 103. The conductive layer 104 may be considered as a pole plate of the capacitor. The metal middle frame 103 may be considered as another pole plate of the capacitor. The capacitor may be used as a pressure sensor. For example, specific force is generated when a user presses the cover, and a shape of the conductive layer 104 changes due to an action of the force, so that a distance between the two pole plates of the capacitor changes, and further capacitance of the capacitor changes. Further, magnitude of pressure exerted by the user on the cover is in a direct proportion to the capacitance of the capacitor. For example, larger pressure exerted on the cover leads to a larger capacitance change of the capacitor. Therefore, a correspondence between a user touch gesture and a pressure change of the display may be established. The electronic device determines, according to a received capacitance change signal of the capacitor, a change of pressure exerted by a user on the cover on the display, so as to respond to a corresponding operation.

A structure of the described display having the pressure sensing function is only used as an example of a structure of a display in which a pressure change is detected on the display. A man-machine interaction method in an embodiment of the present invention is implemented on the described display having the pressure sensing function, or may be implemented on an electronic device that obtains and detects a pressure change on a display, for example, a pressure plate.

Figure 2:
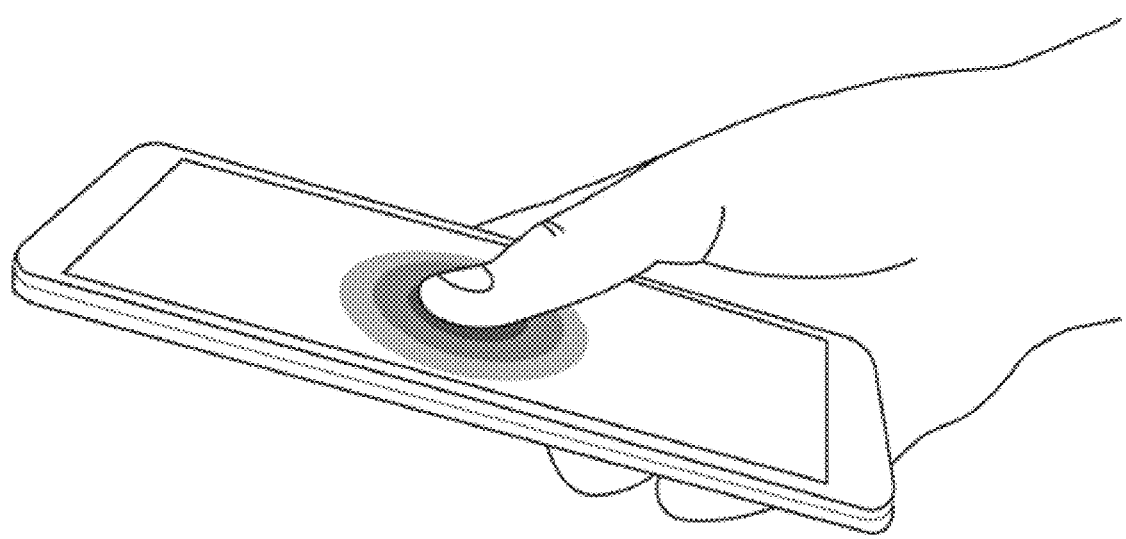
FIG. 2 is a schematic diagram of performing an operation on an interface of an electronic device according to an embodiment of the present invention.

FIG. 2 is a schematic diagram of performing an operation on an interface of an electronic device according to an embodiment of the present invention. As shown in FIG. 2, when a user presses a screen of a display having a pressure sensing function, the electronic device can recognize a pressure touch of the user. Certainly, the user may alternatively use an input device such as a pressure plate that communicates with the electronic device, to implement pressure input.

This embodiment of the present invention may be applied to an application APP icon displayed on the display, or may be applied to a folder icon. For the folder icon, when it is detected that pressure input exerted on the folder icon meets a first preset condition, one or more shortcut functions preset for the folder icon are displayed. The preset one or more shortcut functions may be one or more shortcut functions that are recently used, or may be one or more shortcut functions most frequently used by a user, or may be one or more shortcut functions specified by a user. The shortcut function mentioned herein may be a specific file, or may be a file editing function. For example, when it is detected that pressure input exerted on a folder icon named "Shopping" meets the first preset condition, for example, when a pressure value is greater than five newtons, a function list pops up, and names or icons of three APPs recently started by a user, for example, icons of Amazon, Ebay, and Taobao, are displayed accordingly. A symbol set by a user for a favorite, for example, a star, is marked on the Taobao, or a special color, a special font, or other special displaying is used to mark that an icon item is set as a favorite of the user. When it is detected that the pressure input exerted on the "Shopping" folder icon continues to increase until a second preset condition is met, a favorite shortcut function of a user is activated, that is, an APP corresponding to the "Taobao" icon is activated/enabled. The icon in this embodiment of the present invention may alternatively be an application APP icon. The following uses an APP icon as an example. All folder icons have a function similar to that of the APP icon, and a specific implementation of the folder icon may be derived according to the following embodiment, and details are not described.

After the electronic device is powered on, in this embodiment of the present invention, a mobile phone configured with a pressure sensing touch screen is used as an example for description. After the mobile phone is unlocked, one or more icons are displayed on a HOME interface. The one or more icons may be an APP icon or a folder icon, or may include an APP icon and a folder icon. When detecting that there is a contact on an icon, a mobile phone determines that the contact is a touch operation or a press operation. If it is detected that a pressure value generated by the touch on the icon is greater than a pressure start value, for example, the pressure start value is 1.25 N, and pressure duration is greater than a preset time, for example, the preset time is 800 ms, the contact is recognized as a press operation. If it is detected that a pressure value generated by the touch on the icon is less than a pressure start value and pressure duration is less than a preset time, for example, the pressure value is less than 1.25 N and the duration is less than 800 ms, the contact is recognized as a click of a touch operation. If it is detected that a pressure value generated by the touch on the icon is less than a pressure start value and pressure duration is greater than a preset time, for example, the pressure value is less than 1.25 N and the duration is greater than 800 ms, the contact is recognized as a long press of a touch operation. The mobile phone regularly detects the pressure value, for example, a pressure value detected by the pressure sensor is obtained every 16 ms. The mobile phone compares the detected pressure value with a preset threshold, and performs a corresponding operation according to a comparison result. Specifically, when the detected pressure value is greater than or equal to a first threshold, for example, 2.5 N, an operation of determining a corresponding shortcut function is performed. For example, related information of a shortcut function preset for an operated icon is determined, such as one or a combination of more of the following information: a shortcut function name or icon, a quantity, an arrangement order, a displaying mode, or the like, so that the determined information is displayed graphically in a state in which a user chooses to display shortcut function information. When the detected pressure value reaches or exceeds a second threshold, for example, 2.95 N, an operation of enabling a default shortcut function is performed, that is, the default shortcut function of the preset shortcut function is activated to exit a current interface, and enter a user interface corresponding to the default shortcut function.

All of the foregoing specific values are examples. A mobile phone development and design person may set foregoing parameters according to an actual requirement or performance such as sensitivity of hardware, and this is not limited in the present invention. The foregoing uses pressure as an example, and is similar to various situations in the following embodiments, and details are not described.

FIG. 3 is a schematic diagram of a man-machine interaction method 200 according to an embodiment of the present invention. The method 200 is applied to an electronic device having a display and a pressure-sensitive surface. The electronic device includes one or more sensors that detect strength of a touch on the pressure-sensitive surface. The method 200 may include:

S210. The electronic device displays at least one icon on the display, where at least one shortcut function is preset for a first software program marked by a first icon of the at least one icon.

S220. The electronic device detects, on the pressure-sensitive surface, first pressure input exerted on the first icon.

S230. When determining that the first pressure input meets a first preset condition, the electronic device determines related information of the at least one shortcut function preset for the first icon.

S240. The electronic device continues, after detecting the first pressure input, to detect second pressure input exerted on the first icon; and activates a default shortcut function of the at least one shortcut function when the electronic device determines that the second pressure input meets a second preset condition.

Specifically, the at least one shortcut function is preset for the first software program marked by the first icon displayed on the display. The electronic device detects the first pressure input and the second pressure input that are exerted on the first icon. The electronic device may determine the information about the at least one shortcut function when the first pressure input meets the first preset condition, and may activate the default shortcut function when the second pressure input meets the second preset condition. The default shortcut function may be a favorite function preset by a user. In this way, when the user needs to implement a shortcut function, instead of selecting the first icon and then selecting and perform an operation on another object, the user performs an operation on only one operation object to implement the default shortcut function of the at least one shortcut function. This can avoid a misoperation caused during multiple selections. Because no finger needs to move, a speed of enabling the default shortcut function may be further increased, and therefore, user experience can be improved.

It should be understood that the display may be combined with the pressure-sensitive surface to form a pressure sensing screen; or the display and the pressure-sensitive surface may be separated, for example, a pressure plate and the display. Alternatively, the pressure sensor may be combined with the display and the pressure-sensitive surface, that is, a pressure sensing touch screen is formed; the pressure sensor, the display, and the pressure-sensitive surface may be separated; or the pressure sensor, the display, and the pressure-sensitive surface are combined in a pairwise manner, for example, a touch screen and a pressure plate, a pressure screen and a touchpad, or a display and a pressure touchpad are combined. This is not limited in this embodiment of the present invention.

It should also be understood that the user may implement the first pressure input and the second pressure input by contacting (pressing) the pressure-sensitive surface for one time; or may implement the first pressure input and the second pressure input by contacting the pressure-sensitive surface for two times or multiple times. Either (the first or second) pressure input may be implemented by contacting a pressure sensing surface for one time, with a user finger staying on the pressure sensing surface, or may be implemented by contacting the pressure sensing surface for two times or multiple times, with a user finger leaving the pressure sensing surface after each time of contacting. This is not limited in this embodiment of the present invention.

It should also be understood that a pressure value of the first pressure input or a pressure value of the second pressure input may be a relative value or an absolute value, for example, the pressure value of the first pressure input or the pressure value of the second pressure input may be specifically a pressure change generated during a press. Alternatively, a pressure value of the first pressure input or a pressure value of the second pressure input may be used to represent a value of a pressure degree. For example, the pressure value 1 of the first pressure input indicates light pressure, and that pressure value 2 of the second pressure input indicates heavy pressure. This is not limited in this embodiment of the present invention.

Further, the first preset condition may be as follows: Within a preset time period, the pressure value of the first pressure input is greater than or equal to a particular threshold or falls within a particular threshold range for at least two times. The second preset condition may be as follows: The pressure value of the second pressure input is greater than a preset threshold or remains in a preset threshold range for a preset time period. Certainly, the first preset condition and the second preset condition may be other conditions related to the pressure value. For example, a maximum pressure value of the first pressure input within a preset time period is greater than a particular threshold, or an average pressure value of the first pressure input within a preset time period is greater than a particular threshold, or a pressure value of the first pressure input reaches a preset peak value and a preset trough value for at least one time within a preset time period. For another example, the pressure value of the second pressure input reaches a specified threshold after remaining for a preset time period, or the pressure value of the second pressure input reaches a specified threshold and remains for a preset time period; or after the pressure value of the second pressure input reaches a specified first threshold, the pressure value of the second pressure input remains in a range from a second threshold to the first threshold for a specified time period, or the pressure value of the second pressure input may fall within a preset threshold range for at least two times. No limitation is imposed on the first preset condition and the second preset condition in this embodiment of the present invention.

It should also be understood that the information about the at least one shortcut function may include marking information, icon information, an arrangement order, or the like of each of the at least one shortcut function, or may include a display font, a display color, a display direction, or the like. This is not limited in this embodiment of the present invention.

Optionally, a user may preset the information about the at least one shortcut function for the first software program, or may add a function of another software program to the at least one shortcut function for the first software program. For example, a shortcut function may be set in an address book APP: setting father or mother as a frequently used contact, adding a contact, or the like; or a shortcut function for sending a short message service message of a short message service APP is set as a shortcut function of the address book APP. In this way, for example, when a screen of a mobile phone displays only the address book APP, a short message service message sending function may be activated by pressing the address book APP. This is not limited in this embodiment of the present invention. This embodiment of the present invention facilitates user operations, and a user can perform settings according a use habit of the user and quickly activate an expected function. Certainly, the electronic device may alternatively detect a shortcut function frequently used by the user, and push the frequently used shortcut function that is detected to the user, for the user to choose and set the shortcut function; or the electronic device automatically sets one or more frequently used shortcut functions that are detected as a shortcut function or shortcut functions. In addition, details about how many shortcut functions can be or need to be set may be selected by the user. If a user does not perform a selection, there may be a system default value, for example, four shortcut functions. Different quantities of shortcut functions may be set for different software programs. For example, a shortcut function quantity and a specific function are set according to a factor such as a software program property, a user requirement, a screen size, or display space. For example, for a phone-dialing APP, a shortcut function may be set for one to five telephone numbers or contacts, and for a short message service APP, two shortcut functions of writing a short message service message and viewing a short message service message may be set. This is not limited in this embodiment of the present invention.

Optionally, a folder includes one or more applications APPs. The electronic device detects pressure input exerted on an icon of the folder. The electronic device determines whether the pressure input exerted on the icon of the folder by the user meets a preset condition, for example, whether the pressure input reaches five newtons. If the pressure input meets the preset condition, the electronic device determines information about a shortcut function preset for the folder. For example, the electronic device determines that four shortcut functions are preset for four APPs that are Facebook, Twitter, Linkedin, and Instagram, where the Facebook APP is set as a favorite by the user. When determining that pressure input on the icon of the folder meets another preset condition, for example, the pressure value is greater than or equal to 8 newtons, the electronic device activates the Facebook APP. In this way, when a user needs to execute a favorite APP, instead of selecting a folder and then selecting the favorite APP, the user performs selection for only one time to start the favorite APP. This can avoid a misoperation caused during multiple selections, can increase a speed of enabling a particular function, and therefore, can improve user experience.

In an optional embodiment, the determining, by the electronic device, information about the at least one shortcut function when determining that the first pressure input meets a first preset condition includes: determining the information about the at least one shortcut function when the electronic device determines that a pressure value of the first pressure input reaches a first threshold within a first preset time period, where the first preset time period is a time interval between a first time point and a second time point, and the first time point is a time at which the electronic device starts to detect the pressure value of the first pressure input exerted on the first icon. For example, a mailbox includes four shortcut functions: email sending, email receiving, email saving, and email deletion. Email sending is set as a default function of the mailbox. For example, when a pressure value of second pressure input on a mailbox icon exceeds 3.4 newtons (N) within a period of 0 milliseconds to 400 milliseconds (ms), the electronic device implements the email sending function. Optionally, a graphical user interface corresponding to email sending may be presented on the display.

In an optional embodiment, the determining, by the electronic device, information about the at least one shortcut function when determining that the first pressure input meets a first preset condition includes: determining the information about the at least one shortcut function when the electronic device determines that a pressure value of the first pressure input falls within a range from a third threshold to a first threshold for at least two times within a first preset time period, where the first preset time period is a time interval between a first time point and a second time point, the first time point is a time at which the electronic device starts to detect the pressure value of the first pressure input exerted on the first icon, the first threshold is greater than the third threshold, and the third threshold is greater than 0. In this way, the electronic device may determine the information about the at least one shortcut function when the pressure value of the second pressure input falls within a range from the third threshold to the first threshold for at least two times within the particular first preset time period, so that the electronic device activates the default shortcut function of the at least one shortcut function according to the pressure value of the second pressure input. For example, when the pressure value of the first pressure input falls within a range from 1 N to 1.9 N for two times within a period of 0 ms to 800 ms, the electronic device determines the information about the at least one shortcut function.

Specifically, the electronic device may determine the information about the at least one shortcut function when the pressure value of the first pressure input reaches the first threshold within the specified first preset time period or when the pressure value of the first pressure input falls within the range from the third threshold to the first threshold for two times within the first preset time period. It should be understood that the information about the at least one shortcut function may be determined by using the foregoing two methods. The electronic device responds to a method in which a corresponding condition is first met, to determine the information about the at least one shortcut function, and this is not limited in this embodiment of the present invention.

In an optional embodiment, after the electronic device determines the information about the at least one shortcut function when determining that the first pressure input meets the first preset condition, the method further includes: displaying, by the electronic device, information about each of the at least one shortcut function on the display, with displaying a mark for information (a user's favorite) about preset default shortcut function, so that display of the information about the default shortcut function is different from display of information about another shortcut function.

Optionally, when the pressure value of the first pressure input changes from 0 to the first threshold, a pressure start threshold (for example, 0.5 N) may be set, that is, when the pressure value of the first pressure input is greater than 0.5 N, it may be deemed that there is a pressure value; when the pressure value of the first pressure input is less than 0.5 N, it may be deemed that there is no pressure value, and an operation may be a touch operation or the like. When the pressure value of the first pressure input increases from 0.5 N to the first threshold, a shadow region may be displayed on the display, for example, a shadow region is displayed around an operated icon. As the pressure value increases gradually, the shadow region increases gradually accordingly until the pressure value reaches the first threshold. The display may present the shadow region before the shadow region increases to a preset maximum value, and when the shadow region increases to a preset maximum value, stops displaying the shadow region and presents a graphical user interface including the at least one shortcut function. If the pressure value decreases during a pressure increase period, the shadow region decreases accordingly. A shadow region is presented to a user to indicate a pressure value of the user, so as to intuitively present a gradual change effect of the pressure value to the user. This can bring convenience for the user to sense magnitude of pressure, can further improve user experience, and bring convenience for the user to perform control.

In an optional embodiment, the displaying a mark for information about the default shortcut function includes: adding, by the electronic device, a marking icon only to the information about the default shortcut function, without adding a marking icon to information about another non-default shortcut function. After the displaying, by the electronic device, information about each of the at least one shortcut function on the display, the method further includes: when the electronic device detects that a user changes a location of the marking icon, determining a shortcut function corresponding to a changed location of the marking icon as the default shortcut function. The user may change the location of the marking icon by means of an operation such as a drag operation or a press operation. This is not limited in this embodiment of the present invention.

In an optional embodiment, after the displaying, by the electronic device, information about each of the at least one shortcut function on the display, the method further includes: detecting, by the electronic device, whether there is a press operation on the information about the at least one shortcut function (for example, by detecting whether there is a user touch in a shortcut function information region, or whether a generated current is greater than or equal to a preset threshold), and when detecting that there is a press operation on information about a shortcut function of the at least one shortcut function, determining, by the electronic device, to implement a shortcut function corresponding to a tap location.

Specifically, for example, the electronic device detects the pressure value of the first pressure input reaches a first threshold (for example, 1.7 N) within a period of 0 ms to 400 ms; the electronic device determines the information about the at least one shortcut function. Optionally, the electronic device displays a graphical user interface including information about each of the at least one shortcut function. For example, there is a marking icon (for example, a pentagon) at a determined location (for example, a first location) of the graphical user interface, where the marking icon (for example, the pentagon) is used to mark a default shortcut function (for example, email sending). That is, the graphical user interface including the information about the at least one shortcut function is displayed when the pressure value of the first pressure input reaches the first threshold within a first preset time period. The graphical user interface may include a shortcut function list of the at least one shortcut function. A shortcut function of the at least one shortcut function is marked with a marking icon (for example, the pentagon). After the graphical user interface including the icon of the at least one shortcut function is displayed. For example, a user may drag the marking icon (the pentagon) from the first location for marking email sending to a second location for marking email receiving, and this indicates that the user changes the default shortcut function from email sending to email receiving. After the setting is completed, the default function of email receiving may be implemented when the pressure value of the second pressure input on the first icon meets a preset second preset condition.

It should be understood that the marking icon may be a word icon, or may be a graph of any shape. A role the marking icon plays is to indicate a default shortcut function. It should also be understood that the marking icon may be near the default shortcut function or may be on an icon of the default shortcut function. No limitation is imposed on a location relationship between a marking icon and an icon of a shortcut function in this embodiment of the present invention. The default shortcut function may be marked by changing a display appearance of an icon or a word of the default shortcut function, for example, by using a color, a font, shadow, animation, or three-dimensional display different from that of an icon or a word of another shortcut function, or any combination thereof. This is not limited in this embodiment of the present invention.

The electronic device may present the information about the at least one shortcut function on the display in a list form, for example, presenting an icon of a shortcut function. The icon of the shortcut function is displayed on the display, to intuitively present a shortcut function list to the user. In addition, a marking icon is used to mark a default shortcut function, and when a user needs to change the default shortcut function marked by the marking icon, the user can determine a new default shortcut function by means of a slide or a tap at a location of the marking icon. In this way, a favorite shortcut function, a frequently used shortcut function, and the like can be changed flexibly according to a user requirement, and user experience can be further improved.

In an optional embodiment, the activating a default shortcut function of the at least one shortcut function when the electronic device determines that the second pressure input meets a second preset condition includes: activating the default shortcut function of the at least one shortcut function when the electronic device detects that a pressure value of the second pressure input reaches a second threshold within the first preset time period, where the second threshold is greater than the first threshold. The first threshold may be understood as a pressure threshold for determining the information about the at least one shortcut function. The second threshold may be understood as a pressure threshold for implementing the default shortcut function of the at least one shortcut function.

Optionally, when the pressure value of the second pressure input changes from the first threshold to the second threshold, a pressure start threshold (for example, 3.0 N) for activating a default shortcut function may be set, that is, when the pressure value of the second pressure input is greater than 3.0 N, it is deemed that the default shortcut function may be activated, or when the pressure value of the second pressure input is less than 3.0 N, it may be deemed that there is no possibility of activating the default shortcut function. A shadow region may be displayed on the display when the pressure value of the second pressure input increases from the pressure start threshold for activating the default shortcut function to the second threshold. For example, a shadow region corresponding to the pressure value is displayed in a display region of the default shortcut function, that is, when the pressure value increases gradually, the shadow region increases accordingly. When the pressure value reaches the second threshold, a current graphical user interface is no longer displayed, but a graphical user interface for the default shortcut function is displayed on the display. A shadow region is presented to a user to indicate a pressure value of the user, so as to intuitively present a gradual change effect of the pressure value to the user. This can bring convenience for the user to sense magnitude of pressure, and can further improve user experience. It should be understood that start thresholds may be set for all thresholds used to activate default shortcut functions in this embodiment of the present invention. A role of the start thresholds is to start to sense a threshold range. When the electronic device detects that a pressure value of (first or second) pressure input gradually changes from a start threshold to a threshold for implementing a shortcut function, a shadow region is presented to the user to indicate a pressure value of the user, so as to intuitively present a gradual change effect of the pressure value to the user. This can bring convenience for the user to sense magnitude of pressure, and can further improve user experience.

In an optional embodiment, the activating the default shortcut function of the at least one shortcut function when the electronic device detects that a pressure value of the second pressure input reaches a second threshold within the first preset time period includes: continuing, by the electronic device when the electronic device detects that the pressure value of the second pressure input reaches the second threshold within the first preset time period, to detect the pressure value of the second pressure input exerted on the first icon within a second preset time period; and activating the default shortcut function of the at least one shortcut function when the electronic device determines that the detected pressure value of the second pressure input is always greater than or equal to the second threshold within the second preset time period, where the second preset time period is a time interval between a third time point and a fourth time point, and the third time point is a time at which the pressure value of the second pressure input reaches the second threshold.

Specifically, if a time point at which the pressure value of the second pressure input reaches 3.4 N (the second threshold) is the $400^{th}$ ms (a third time point), the electronic device does not activate the default shortcut function, but continue to determine whether the pressure value of the second pressure input is greater than 3.4 N (the second threshold) within a subsequent second preset time period, for example, 50 ms (that is, a fourth time point is the $450^{th}$ ms). In this way, when the pressure value of the second pressure input can reach the second threshold within the given first preset time period, the default shortcut function may be not activated because the user may perform a misoperation in a press process, for example, an accidental tap may cause the pressure value of the second pressure input on the first icon to reach the second threshold. Determining is performed again after a specified delay to determine there is no misoperation, that is, to determine, after the pressure value of the second pressure input reaches the second threshold, whether the pressure value of the second pressure input remains greater than or equal to the second threshold for the second preset time period. If the pressure value of the second pressure input remains for the second preset time period, the electronic device determines that the user does not perform a misoperation, and that the default shortcut function really needs to be implemented, and the electronic device activates the default shortcut function.

In an optional embodiment, the activating a default shortcut function of the at least one shortcut function when the electronic device determines that the second pressure input meets a second preset condition includes: activating the default shortcut function of the at least one shortcut function when the electronic device detects that a pressure value of the second pressure input reaches a fourth threshold, where the fourth threshold is greater than the first threshold.

In an optional embodiment, when the electronic device detects that the pressure value of the second pressure input is greater than or equal to a fifth threshold and less than the fourth threshold, the electronic device determines whether the pressure value of the second pressure input exerted on the first icon is always greater than or equal to the fifth threshold and less than the fourth threshold within a subsequent third preset time period; and activates the default shortcut function of the at least one shortcut function if the pressure value of the second pressure input exerted on the first icon is always greater than or equal to the fifth threshold and less than the fourth threshold within the third preset time period, where the third preset time period is a time interval between a fifth time point and a sixth time point, and the fifth time point is a time at which the pressure value of the second pressure input reaches the fifth threshold. For example, the pressure value of the second pressure input reaches the fifth threshold 2.4 N at a time point of the $400^{th}$ ms, the third preset time period may be 100 ms, that is, the fifth time point is the $400^{th}$ ms, and the sixth time point is the $500^{th}$ ms. The fourth threshold is greater than the fifth threshold. No limitation is imposed on a value relationship between the fourth threshold and the second threshold in this embodiment of the present invention. The fourth threshold may be greater than, less than, or equal to the second threshold, or the like. Certainly, the value relationship between the second threshold and the fifth threshold is not limited. Preferably, the second threshold is greater than the fifth threshold, but the fifth threshold is greater than the first threshold.

In an actual application process, a hardware fault may occur, and there is a relatively large deviation between a detected pressure value and a real situation, so that a preset threshold cannot be reached regardless of how much pressure a user exerts. In addition, there is a relatively great difference between different press behaviors of different users, that is, it may be easy for finger pressure values of some users to reach the specified fourth threshold, but it may be difficult for finger pressure values of some users to reach the specified fourth threshold. To ensure that a preset function can still be implemented in these cases, this embodiment may be used. That is, when the electronic device detects that the pressure value of the second pressure input of the user does not reach the fourth threshold, but reach the preset fifth threshold, the electronic device continues, within a subsequent (third) preset time period, to detect whether the pressure value of the second pressure input of the user that reaches the fifth threshold remains for a third preset time period, and after the electronic device determines that the pressure value of the second pressure input remains for the preset third preset time period, the electronic device determines that the user needs to operate the default shortcut function, and the electronic device activates the default shortcut function. A value obtained by subtracting the fifth threshold by the fourth threshold may be considered as a compensation for the pressure value. According to this embodiment, a preset function may be implemented in a special case by using a pressure value less than a preset threshold. This reduces an implementation difficulty and increases usability.

In an optional embodiment, the activating a default shortcut function of the at least one shortcut function when the electronic device determines that the second pressure input meets a second preset condition includes: activating the default shortcut function of the at least one shortcut function when the electronic device determines that a pressure value of the second pressure input falls within a range from the third threshold to the first threshold for at least two times and that a time interval between the at least two times meets a preset dual-pressure time condition, where the first threshold is greater than the third threshold, the preset dual-pressure time condition may be, for example, that the time interval between the at least two times is within a fifth preset time period, and the fifth preset time period may be between a time point at which the second pressure input starts and a time point at which the second pressure input ends. For example, when the pressure value of the second pressure input falls within the range from 1 N to 1.9 N for two times, the electronic device determines to implement the default shortcut function of the at least one shortcut function. This is not limited in this embodiment of the present invention.

In an optional embodiment, the activating a default shortcut function of the at least one shortcut function when the electronic device determines that the second pressure input meets a second preset condition includes: continuing, by the electronic device, to detect the pressure value of the second pressure input when the electronic device determines that the pressure value of the second pressure input is less than a sixth threshold; and activating the default function of the at least one shortcut function when the electronic device determines that the pressure value of the second pressure input reaches a seventh threshold, where the sixth threshold is less than the first threshold, and the seventh threshold is greater than the first threshold.

In an optional embodiment, the determining, by the electronic device, information about the at least one shortcut function when determining that the first pressure input meets a first preset condition includes: determining, by the electronic device, whether a pressure value of the first pressure input is greater than or equal to a second threshold, and determining the information about the at least one shortcut function if the pressure value of the first pressure input is greater than or equal to the second threshold; and the activating a default shortcut function of the at least one shortcut function when the electronic device determines that the second pressure input meets a second preset condition includes: determining, by the electronic device, whether a pressure value of the second pressure input is always greater than or equal to the second threshold within a fourth preset time period, and activating the default shortcut function of the at least one shortcut function if the pressure value of the second pressure input exerted on the first icon is always greater than or equal to the second threshold within the fourth preset time period, where the fourth preset time period is a time interval between a seventh time point and an eighth time point, and the seventh time point is a time at which the pressure value of the second pressure input reaches the second threshold. For example, the electronic device determines the information about the at least one shortcut function when detecting whether the pressure value of the second pressure input is greater than 3.4 N (the second threshold), and can activate the default shortcut function when the pressure value of the second pressure input remains greater than 3.4 N for 100 ms (a fourth time period).

In a preferred embodiment, the electronic device determines the information about the at least one shortcut function when the pressure value of the first pressure input reaches the first threshold within the first preset time period. Optionally, the information about the at least one shortcut function may be displayed on the display. The electronic device determines to activate the default shortcut function when the pressure value of the second pressure input reaches the second threshold (greater than the first threshold) within the first preset time period. When the pressure value of the second pressure input reaches the first threshold, but does not reach the second threshold within the first preset time period, and the pressure value of the second pressure input reaches a fifth threshold after the first preset time period, the electronic device continues, within a third preset time period, to detect the pressure value of the second pressure input executed on the first icon. When the pressure value of the second pressure input is always greater than the fifth threshold within the third time period, the electronic device determines to activate the default shortcut function. The electronic device activates the default shortcut function when the electronic device detects that the pressure value of the second pressure input is always greater than or equal to the fifth threshold and less than the fourth threshold within the third preset time period. The electronic device continues to detect the pressure value of the second pressure input when the electronic device detects that the pressure value of the second pressure input is less than a sixth threshold (greater than α and less than the first threshold) after the first preset time period, and the electronic device activates the default shortcut function when the pressure value of the second pressure input reaches a seventh threshold (greater than the first threshold).

Figure 4:
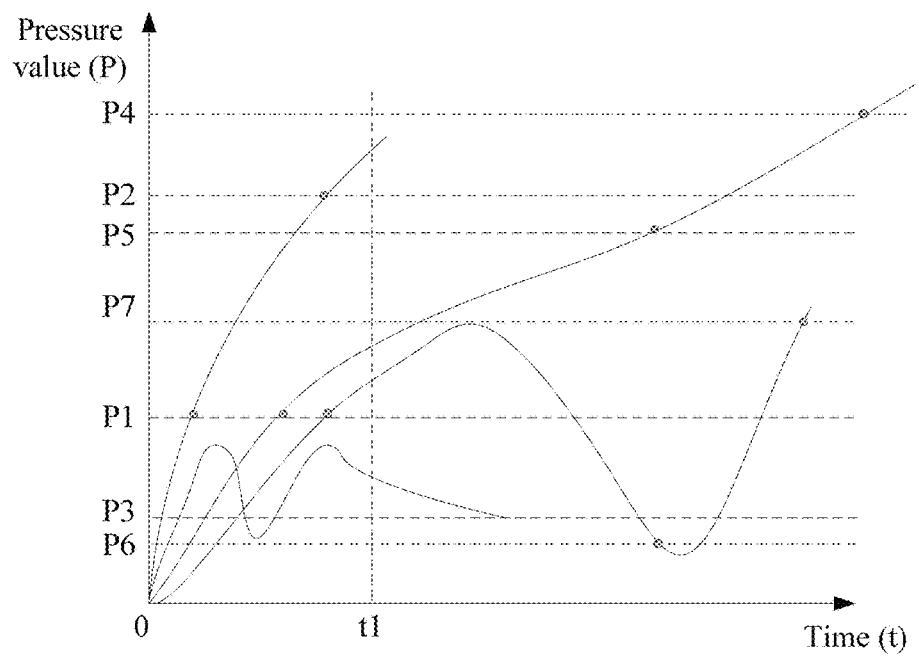
FIG. 4 is a schematic diagram of a pressure curve according to an embodiment of the present invention.

It should be understood that in this embodiment of the present invention, the sixth threshold is less than the first threshold, the third threshold is less than the first threshold, and a value relationship between the third threshold and the sixth threshold may be not limited. Certainly, preferably, the third threshold may be greater than the sixth threshold, the second threshold is greater than the first threshold, the fifth threshold is greater than first threshold, the seventh threshold is greater than the first threshold, and a value relationship between the second threshold, the fifth threshold, and the seventh threshold may be not limited. Certainly, preferably, the second threshold may be greater than the fifth threshold, and the fifth threshold is greater than the seventh threshold; and the fourth threshold is greater than the fifth threshold, and a value relationship between the fourth threshold and the second threshold may be not limited. The fourth threshold may be equal to the second threshold, or the second threshold may be greater than the fourth threshold. The first threshold, the second threshold, the third threshold, the fourth threshold, the fifth threshold, the sixth threshold, and the seventh threshold that are mentioned in this embodiment of the present invention may be determined according to an internal logic relationship. As a specific example, FIG. 4 is a line graph of the first threshold (P1), the second threshold (P2), the third threshold (P3), the fourth threshold (P4), the fifth threshold (P5), the sixth threshold (P6), and the seventh threshold (P7), and certainly, the line graph is merely an example and does not include a value relationship between all thresholds in this embodiment of the present invention. A time period of 0 to t1 in the figure may be understood as the first preset time period.

Therefore, according to the man-machine interaction method provided in this embodiment of the present invention, the electronic device sets a compensation threshold according to a different operation of a user to activate the default shortcut function; or the electronic device may detect, according to a pressure value remaining period, whether a real objective of the user is to implement the default shortcut function. The electronic device may alternatively present the graphical user interface including the information about the default shortcut function, so that the user resets the default shortcut function according to a requirement. This can improve user operation flexibility. The pressure value is detected at the location of the first icon to implement the default shortcut function. This can avoid a misoperation caused during multiple selections, can be used according to a different operation of a user, can increase a speed of enabling a default function, and further improves user experience.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

The following describes in detail the man-machine interaction method provided in this embodiment of the present invention. It should be understood that the embodiments described in the following are merely some embodiments of the present invention. Any embodiment combination of the present invention shall fall within the protection scope of the present invention.

Figure 5:
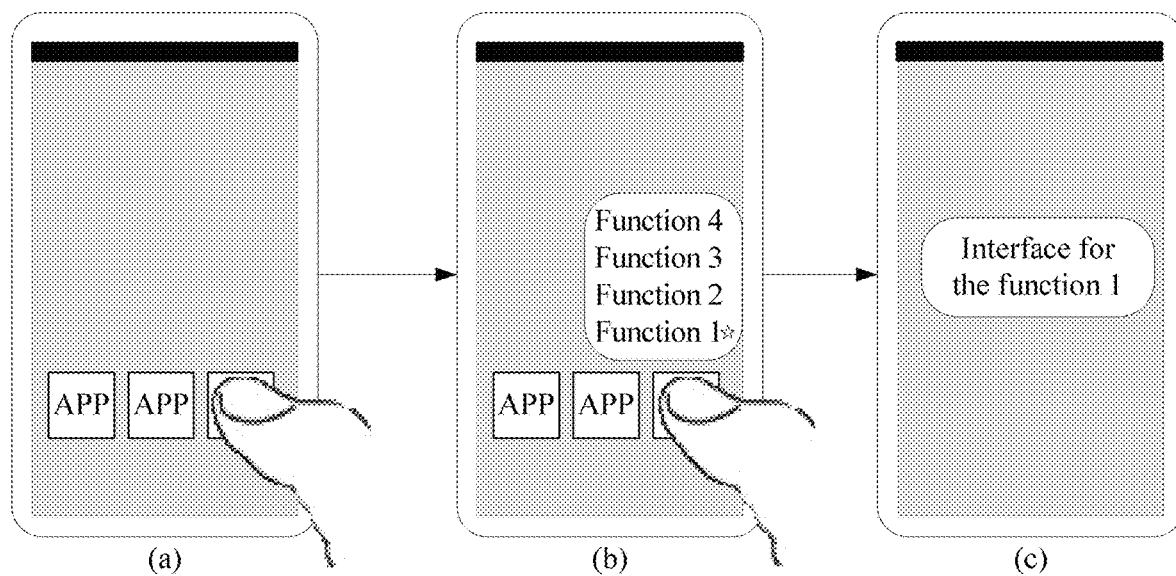
FIG. 5 is a schematic diagram of another man-machine interaction method according to an embodiment of the present invention.

In an example, as shown in FIG. 5, pressure input at an APP icon location pressed by a finger in FIG. 5(*a*) is first detected. When a pressure value of first pressure input reaches 1.9 N (a first threshold) within a period of 0 ms to 800 ms (a first preset time period), a graphical user interface including a shortcut function list is displayed, as shown in FIG. 5(*b*). A pentagon icon is marked near a function 1. After the graphical user interface including the function list is displayed, whether a pressure value of second pressure input at an APP icon location exceeds 2.7 N (for example, a fourth threshold or a seventh threshold) is determined in FIG. 5(*b*). When the pressure value of the second pressure input exceeds 2.7 N, the electronic device activates the function 1, and a graphical user interface corresponding to the function 1 is displayed, as shown in FIG. 5(*c*).

Figure 6:
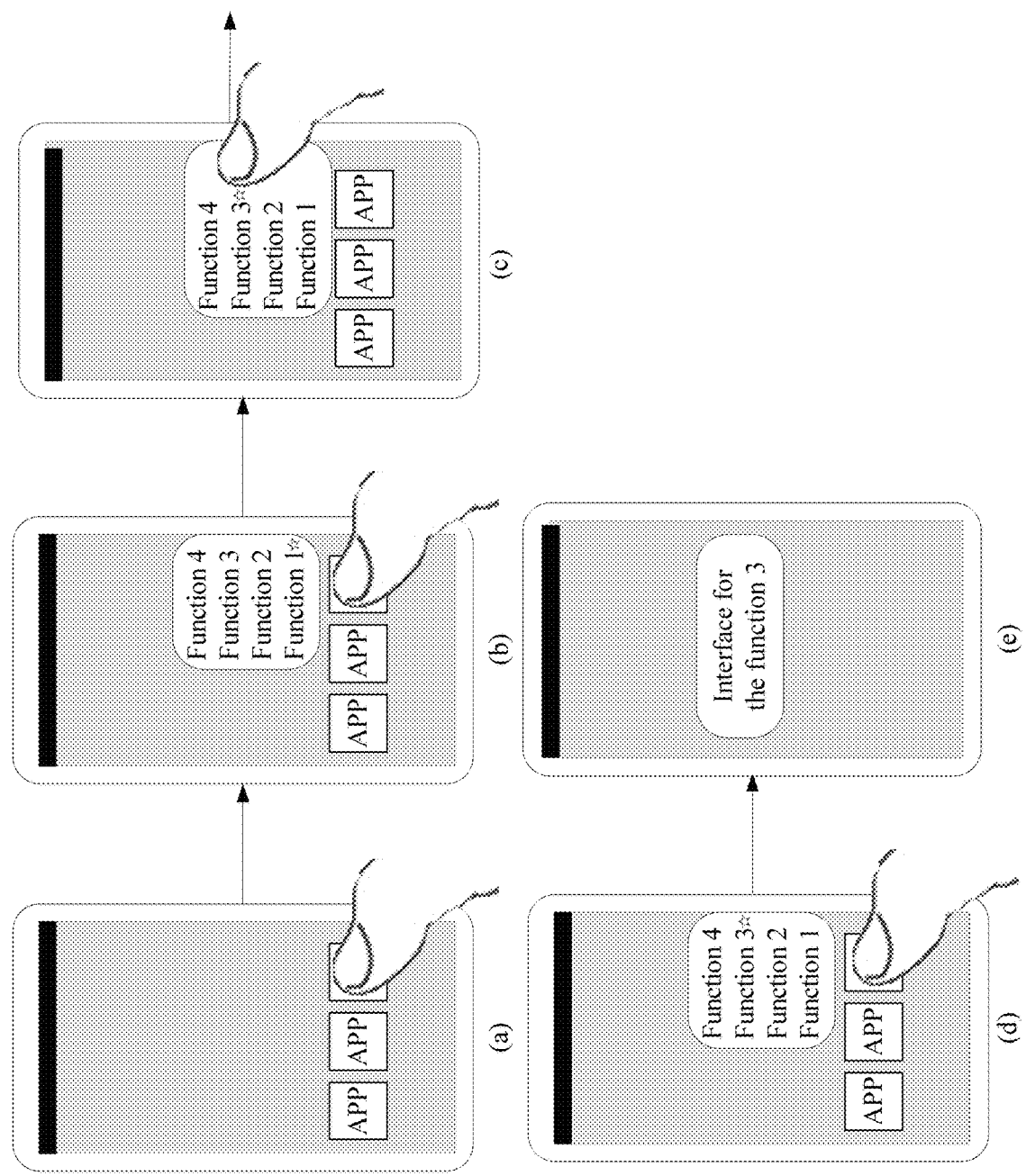
FIG. 6 is a schematic diagram of still another man-machine interaction method according to an embodiment of the present invention.

In an example, as shown in FIG. 6, first pressure input at an APP icon location pressed by a finger in FIG. 6(*a*) is first detected. When a pressure value of the first pressure input reaches 1.9 N (a first threshold) within a period of 0 ms to 800 ms (a first preset time period), a graphical user interface including a function list is displayed, as shown in FIG. 6(*b*). A pentagon icon is marked at the first location near a function 1. After the graphical interface including the function list is displayed, as shown in FIG. 6(*b*), the electronic device determines a function 3 as the default shortcut function when the electronic device detects that the user slides the pentagon icon from the first location to a second location near the function 3. In this case, the user finger leaves the second location and returns to the APP icon location, and whether a pressure value of second pressure input at an APP icon location pressed by the finger in FIG. 6(*d*) exceeds 2.7 N (a fourth threshold or a seventh threshold) is determined. The electronic device implements the function 3 when the pressure value of the second pressure input exceeds 2.7 N, and a graphical user interface corresponding to the function 3 is displayed, as shown in FIG. 6(*e*); or the electronic device implements the function 3 when detecting that a user taps an icon for the function 3 in FIG. 6(*d*), and a graphical user interface corresponding to the function 3 is displayed, as shown in FIG. 6(*e*).

In an example, as shown in FIG. 5, first pressure input at a first location (for example, an APP icon location pressed by a finger in the figure) in FIG. 5(*a*) is first detected. When a pressure value of the first pressure input falls within a range from 1 N (a third threshold) to 1.9 N (a first threshold) for two times within a period of 0 ms to 800 ms (a first preset time period), a graphical user interface including a list of at least one shortcut function is displayed, as shown in FIG. 5(*b*). A pentagon icon is marked near a function 1. After the graphical interface including the function list is displayed, whether a pressure value of second pressure input at an APP icon location pressed by a finger in FIG. 5(*b*) exceeds 2.7 N (for example, a fourth threshold or a seventh threshold) is determined in FIG. 5(*b*). When the pressure value of the second pressure input exceeds 2.7 N, the electronic device displays a graphical user interface corresponding to the function 1 in FIG. 5(*c*).

In an example, as shown in FIG. 6, pressure input at an APP icon location pressed by a finger in FIG. 6(*a*) is first detected. When a pressure value of second pressure input falls within a range from 1 N (a third threshold) to 1.9 N (a first threshold) for two times after a period of 0 ms to 800 ms (a first preset time period), a graphical user interface including a function list is displayed, as shown in FIG. 6(*b*). A pentagon icon is marked at a first location near a function 1. After the graphical interface including the function list is displayed, the electronic device determines, as shown in FIG. 6(*e*), a function 3 as the default shortcut function, when the electronic device detects that the user slides the pentagon icon from the first location to a second location near the function 3, as shown in FIG. 6(*c*). In this case, the finger leaves the second location and returns to the first location, and whether a pressure value of second pressure input at an APP icon location in FIG. 6(*d*) pressed by the finger exceeds 2.7 N (for example, a fourth threshold or a seventh threshold) is determined. When the pressure value of the second pressure input exceeds 2.7 N, the electronic device responds to an instruction corresponding to the function 3, and a graphical user interface corresponding to the function 3 is displayed, as shown in FIG. 6(*e*); or when detecting that a user performs a tap at the second location in FIG. 6(*d*), the electronic device responds to an instruction corresponding to the function 3, and a graphical user interface corresponding to the function 3 is displayed, as shown in FIG. 6(*e*).

In an example, as shown in FIG. 6, on a basis of FIG. 6(*b*), that is, after a function list is displayed, each time the finger presses the icon, a location a pentagon icon is changed; or on a basis of FIG. 6(*b*), a selected function is changed according to a sequence each time the finger presses (slightly presses) the APP icon. For example, a function item marked by the pentagon icon is selected by default when the function list is displayed, such as the function 1 in FIG. (b); and when the finger presses the APP icon again, a function 2 is selected, or a function 4 is selected. The finger presses an icon heavily to activate a selected function. For example, after being selected, the function 4 is activated if the user presses the APP icon heavily. In this way, the user can activate a particular function only by inputting different degrees of force on the icon, with no need to move the finger. This can avoid a misoperation and improve operation efficiency.

Figure 7:
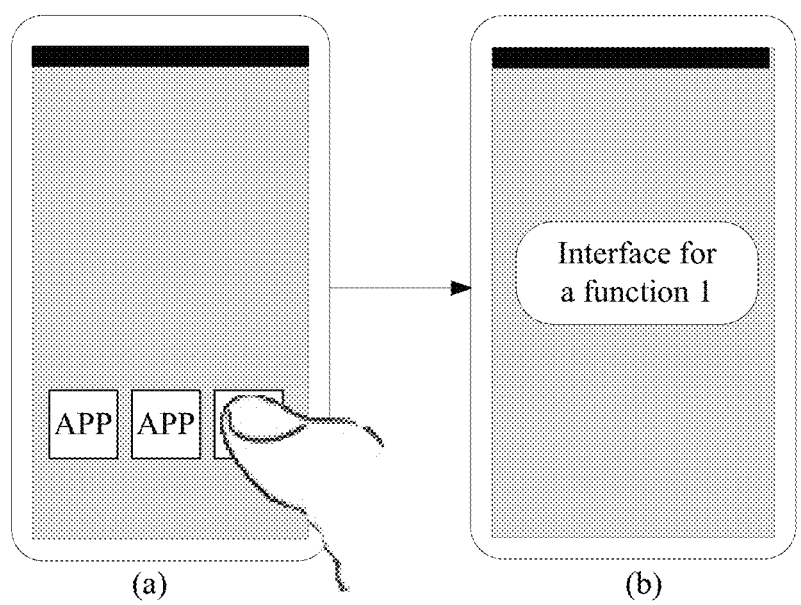
FIG. 7 is a schematic diagram of still another man-machine interaction method according to an embodiment of the present invention.

In an example, as shown in FIG. 7, a pressure value of second pressure input at an APP icon location pressed by a finger in FIG. 7(*a*) is first detected. When the pressure value of the second pressure input reaches 3.4 N (a second threshold) within a period of 0 ms to 800 ms (a first preset time period), the electronic device implements a function 1 (for example, the function 1 is a default shortcut function), and a graphical user interface corresponding to the function 1 is displayed, as shown in FIG. 7(*b*). It should be understood that the pressure value of the second pressure input inevitably reaches 1.9 N (a first threshold) when reaching 3.4 N (a second threshold) within the period of 0 ms to 800 ms, the electronic device can also determine the information about the at least one shortcut function, but may not display a list including a shortcut function to the user.

In an example, as shown in FIG. 7, a pressure value of pressure input at an APP icon location pressed by a finger in FIG. 7(*a*) is first detected. When the pressure value of the first pressure input reaches 1.9 N (a first threshold), but does not reach 3.4 N (a second threshold) within a period of 0 ms to 800 ms (a first preset time period), the electronic device continues to detect a pressure value of second pressure input. When the pressure value of second pressure input reaches 3.5 N (a fourth threshold) or reaches 3.0 N (a fifth threshold) and remains for 100 ms (a third preset time period), the electronic device implements a function 1 (assuming that the function 1 is a default shortcut function), and a graphical user interface corresponding to the function 1 is displayed, as shown in FIG. 7(*b*). It should be understood that the pressure value of the first pressure input reaches 1.9 N (the first threshold) within the period of 0 ms to 800 ms, the electronic device can also determine the information about the at least one shortcut function, but may not display a list including a shortcut function to the user. To avoid repetition, specific examples are not listed one by one in the following.

Figure 8:
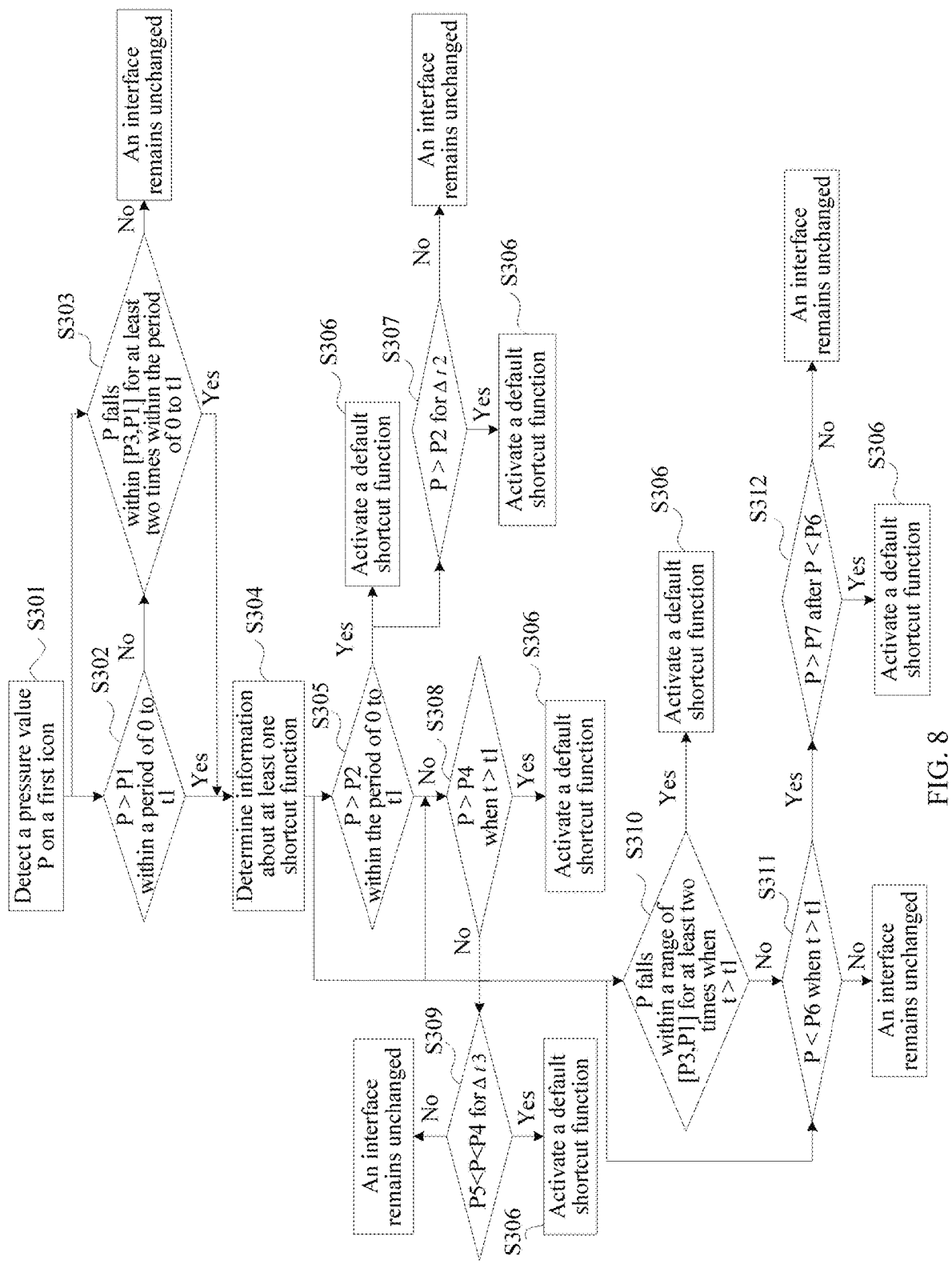
FIG. 8 is a schematic diagram of still another man-machine interaction method according to an embodiment of the present invention.

In a preferred embodiment, FIG. 8 shows a man-machine interaction method 300 according to an embodiment of the present invention. The method 300 includes the following steps.

S301. An electronic device detects a pressure value P at a location of a first icon.

S302. The electronic device determines whether P is greater than P1 (a first threshold) within a time period of 0 to t1.

S303. The electronic device determines information about at least one shortcut function when P is less than P1 within the time period of 0 to t1 and P falls within a range from P3 to P1 for at least two times.

Optionally, no limitation is imposed on a sequence of S302 and S303. For example, step S302 may be performed after step S301; or step S303 may be performed after step S301; or step S302 is performed after step S301, and step S303 is performed after step S302 is performed. This is not limited in this embodiment of the present invention.

S304. The electronic device determines information about at least one shortcut function when P is greater than P1 within the time period of 0 to t1.

Optionally, after the information about the at least one shortcut function is determined, the information about the at least one shortcut function may be presented to a user, or a marking icon that marks a default shortcut function may be presented. Optionally, a user may reset the default shortcut function by changing a marking icon location.

S305. The electronic device determines whether P is greater than P2 (a second threshold) within the time period of 0 to t1.

S306. The electronic device activates a default shortcut function when the electronic device determines that P is greater than P2 within the time period of 0 to t1.

S307. When the electronic device determines that P is greater than P2 within the time period of 0 to t1, the electronic device continues to determine whether a pressure value of second pressure input remains greater than P4 for Δt2 (a second preset time period); and when the pressure value of the second pressure input remains greater than P2 for Δt2 (the second preset time period), the electronic device activates the default shortcut function; or when the pressure value of the second pressure input remains greater than P2 for a period less than Δt2 (the second preset time period), a current operation interface remains unchanged.

S308. When the electronic device determines that P is less than P2 (the second threshold) within the time period of 0 to t1, the electronic device determines whether P is greater than P4 (a fourth threshold) after the time period of 0 to t1, and the electronic device activates a default shortcut function when P is greater than P4.

S309. When P is less than or equal to P4, the electronic device determines whether P is always greater than P5 (a fifth threshold) and less than P4 (the fourth threshold) within Δt3 (a third preset time period); and when P is always greater than P5 and less than P4 within Δt3 the electronic device activates the default shortcut function, or when P is not always meet a condition of greater than P5 and less than P4 within Δt3, a current operation interface remains unchanged.

S310. When t>t1 and P<P4, the electronic device determines whether P falls within a range from P3 to P1 for at least two times, and the electronic device activates the default shortcut function when P falls within the range from P3 to P1 for at least two times.

S311. When t>t1 and P<P4, the electronic device determines whether P is less than P6 (a sixth threshold), or when P falls within the range from P3 to P1 for less than two times, the electronic device determines whether P is less than P6 (the sixth threshold); and when P is greater than P6, an interface remains unchanged.

S312. After P is less than P6 when t>t1, the electronic device determines whether P is greater than P7 (a seventh threshold), and when P is greater than P7, the electronic device activates the default shortcut function, or when P is less than or equal to P7, an interface remains unchanged.

It should be understood that FIG. 8 shows merely a preferred embodiment. A combination of steps in FIG. 8 may be used to implement the default shortcut function, for example, S301 and S302 and/or S303, S304, S305, and S306;
S301 and S302 and/or S303, S304, S305, S307, and S306;
S301 and S302 and/or S303, S304, S305, S308, and S306;
S301 and S302 and/or S303, S304, S305, S308, S309, and S306;
S301 and S302 and/or S303, S304, S305, S308, S310, and S306;
S301 and S302 and/or S303, S304, S305, S308, S311, S312, and S306; or
S301 and S302 and/or S303, S304, S305, S308, S310, S311, S312, and S306.

Optionally, any branch for activating the default shortcut function after S304 may start to be executed directly after S304, for example, S301 and S302 and/or S303, S304, S308, and S306;
S301 and S302 and/or S303, S304, S309, and S306;
S301 and S302 and/or S303, S304, S308, S309, and S306;
S301 and S302 and/or S303, S304, S310, and S306;
S301 and S302 and/or S303, S304, S311, S312, and S306; or
S301 and S302 and/or S303, S304, S310, S311, S312, and S306.

As an embodiment, parameters in the foregoing embodiments may alternatively use the following values: P1=2.5 N, P3=0.5×P1, P7≤P3, P8=P1+0.2 N, P5=P1+0.3 N, P4=P1+0.45 N, P6≥P4, and t1=800 ms.

Therefore, according to the man-machine interaction method provided in this embodiment of the present invention, the electronic device sets a compensation threshold according to a different operation of a user to activate the default shortcut function; or the electronic device may detect, according to a pressure value remaining period, whether a real objective of the user is to implement the default shortcut function. The electronic device may alternatively display, to the user, a graphical user interface including an icon for the default shortcut function, so that the user resets the default shortcut function according to a requirement. This can improve user operation flexibility. The pressure value is detected at an APP icon location to implement the default shortcut function. This can avoid a misoperation caused during multiple selections, can be used by users with different operations, can increase a speed of enabling the default shortcut function, and further improves user experience.

The foregoing describes in detail the man-machine interaction method with reference to FIG. 1 to FIG. 8. The following describes, with reference to FIG. 9 and FIG. 10, in detail an electronic device according to embodiments of the present invention. The electronic device described in the embodiments of the present invention is the electronic device that implements the foregoing method.

Figure 9:
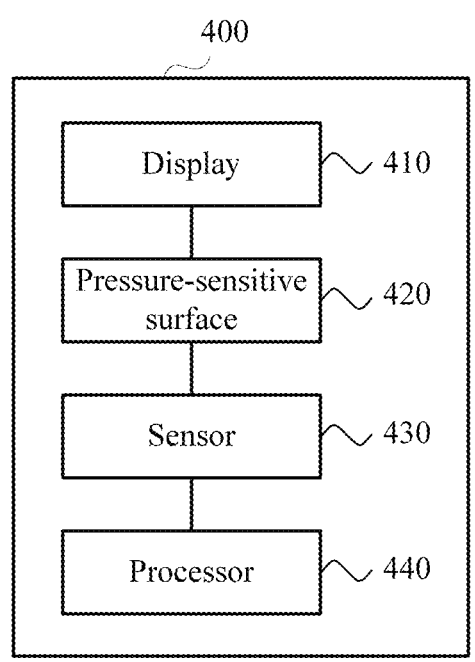
FIG. 9 is a schematic diagram of an electronic device according to an embodiment of the present invention.

FIG. 9 is a schematic diagram of an electronic device 400 according to an embodiment of the present invention. The electronic device 400 may include a display 410, a pressure-sensitive surface 420, a sensor 430, and a processor 440. There is one or more sensors 430. There is one or more processors 440.

Specifically, at least one icon is displayed on the display 410. At least one shortcut function is preset for a first software program marked by a first icon of the at least one icon. The sensor 430 is configured to detect, on the pressure-sensitive surface 420, first pressure input exerted on the first icon. The processor 440 is configured to determine information about the at least one shortcut function when determining that the first pressure input meets a first preset condition. The sensor 430 is further configured to continue to detect, after detecting the first pressure input, second pressure input exerted on the first icon. The processor 440 is further configured to activate a default shortcut function of the at least one shortcut function when determining that the second pressure input meets a second preset condition.

It should be understood that the display 410 may be combined with the pressure-sensitive surface to form a touch screen; or the display 410 and the pressure-sensitive surface may be separated, for example, a touchpad and the display. Alternatively, the sensor 430 may be combined with the display 410 and the pressure-sensitive surface, that is, a pressure sensing touch screen is formed; the sensor 430, the display 410, and the pressure-sensitive surface may be separated from each other; or the sensor 430, the display 410, and the pressure-sensitive surface are combined in a pairwise manner, for example, a touch screen and a pressure plate, a pressure screen and a touchpad, or a display and a pressure touchpad are combined. This is not limited in this embodiment of the present invention.

In this embodiment of the present invention, the sensor 430 may be a resistive sensor, a capacitive sensor, an inductive sensor, or the like. There may be one or more sensors 430. The sensor 430 may be deployed at one or more locations of the electronic device 400, for example, on a lower part of or around the display 410, and may be configured to detect pressure at at least one location of an outer surface of the electronic device 400. For example, when a user performs a touch operation such as a tap, a slide, or a particular gesture on an icon on the display 410, the sensor 430 may sense a change of a circuit parameter such as resistance, capacitance, or inductance caused by the touch operation of the user. Optionally, the sensor 430 may send related information of the circuit parameter change to the processor 440. The processor 440 may determine a pressure value according to the related information of the circuit parameter change. In another optional embodiment, the sensor 120 may include a pressure detection component and a pressure controller. The pressure detection component is configured to sense a circuit parameter change caused by the touch operation of the user. The pressure controller may be configured to determine a pressure value according to the circuit parameter change detected by the pressure detection component, and send the determined pressure value to the processor 440. This is not limited in this embodiment of the present invention.

In this way, when a user needs to implement a shortcut function, instead of selecting the first icon and then selecting the shortcut function, the user performs selection for only one time to implement the default shortcut function of the at least one shortcut function. This can avoid a misoperation caused during multiple selections, can further increase a speed of enabling the default shortcut function, and therefore, can improve user experience.

In an optional embodiment, the processor 440 is specifically configured to determine the information about the at least one shortcut function when a pressure value of the first pressure input reaches a first threshold within a first preset time period. The first preset time period is a time interval between a first time point and a second time point, and the first time point is a time at which the sensor starts to detect the pressure value of the first pressure input exerted on the first icon.

In an optional embodiment, the processor 440 is further specifically configured to determine the information about the at least one shortcut function when determining that a pressure value of the first pressure input falls within a range from a third threshold to a first threshold for at least two times within a first preset time period. The first preset time period is a time interval between a first time point and a second time point, the first time point is a time at which the sensor starts to detect the pressure value of the first pressure input exerted on the first icon, and the first threshold is greater than the third threshold.

In an optional embodiment, the processor 440 is further specifically configured to activate the default shortcut function of the at least one shortcut function when the sensor detects that a pressure value of the second pressure input reaches a second threshold within the first preset time period. The second threshold is greater than the first threshold.

In an optional embodiment, the sensor 430 is further configured to: when the pressure value of the second pressure input reaches the second threshold within the first preset time period, the sensor continues to detect the pressure value of the second pressure input exerted on the first icon within a second preset time period. The processor is specifically configured to activate the default shortcut function of the at least one shortcut function when determining that the detected pressure value of the second pressure input is always greater than or equal to the second threshold within the second preset time period. The second preset time period is a time interval between a third time point and a fourth time point, and the third time point is a time at which the pressure value of the second pressure input reaches the second threshold.

In an optional embodiment, the processor 440 is further specifically configured to activate the default shortcut function of the at least one shortcut function when detecting that the pressure value of the second pressure input reaches a fourth threshold. The fourth threshold is greater than the first threshold.

In an optional embodiment, the processor 440 is further specifically configured to: when detecting that the pressure value of the second pressure input is greater than or equal to a fifth threshold and less than the fourth threshold, determine whether the pressure value of the second pressure input exerted on the first icon is always greater than or equal to the fifth threshold and less than the fourth threshold within a subsequent third preset time period; and activate the default shortcut function of the at least one shortcut function if the pressure value of the second pressure input exerted on the first icon is always greater than or equal to the fifth threshold and less than the fourth threshold within the third preset time period. The fourth threshold is greater than the fifth threshold.

In an optional embodiment, the processor 440 is further specifically configured to activate the default shortcut function of the at least one shortcut function when the electronic device determines that a pressure value of the second pressure input falls within a range from the third threshold to the first threshold for at least two times and that a time interval between the at least two times meets a preset dual-pressure time condition. The first threshold is greater than the third threshold.

In an optional embodiment, the sensor 430 is further configured to continue to detect the pressure value of the second pressure input when the pressure value of the second pressure input is less than a sixth threshold. The processor 440 is further specifically configured to activate the default function of the at least one shortcut function when the pressure value of the second pressure input reaches a seventh threshold. The sixth threshold is less than the first threshold, and the seventh threshold is greater than the first threshold.

In an optional embodiment, the processor 440 is further configured to: determine whether a pressure value of the first pressure input is greater than or equal to a second threshold, and determine the information about the at least one shortcut function if the pressure value of the first pressure input is greater than or equal to the second threshold; and determine whether a pressure value of the second pressure input is always greater than or equal to the second threshold within a fourth preset time period, and activate the default shortcut function of the at least one shortcut function if the pressure value of the second pressure input exerted on the first icon is always greater than or equal to the second threshold within the fourth preset time period.

In an optional embodiment, the processor 440 is further configured to: after the information about the at least one shortcut function is determined when the first pressure input meets the first preset condition, display information about each of the at least one shortcut function on the display, with displaying a mark for information about the default shortcut function, so that display of the information about the default shortcut function is different from display of information about another shortcut function.

In an optional embodiment, the processor 440 is further configured to: add a marking icon only to the information about the default shortcut function, without adding a marking icon to information about another non-default shortcut function; and after the information about each of the at least one shortcut function is displayed on the display, when the sensor detects that a user changes a location of the marking icon, determine a shortcut function corresponding to a changed location of the marking icon as the default shortcut function.

In an optional embodiment, the electronic device may further include a memory, configured to store a software program or module. In this case, the processor 440 may run or execute the software program and/or module stored in the memory, and invoke data stored in the memory, to implement various functions of the electronic device and/or process data. Optionally, the processor 440 may include an integrated circuit (Integrated Circuit, IC), for example, may include a single packaged IC, or may be formed by connecting multiple packaged ICs having a same function or different functions. The processor 440 may be a central processing unit (Central Processing Unit, CPU), or the processor 440 may be another general purpose processor, a digital signal processor (DSP), an application-specific integrated circuit (ASIC), a field programmable gate array (FPGA) or another programmable logical device, a discrete gate or transistor logical device, a discrete hardware assembly, or the like. The general purpose processor may be a microprocessor, or the processor may be any conventional processor or the like. This is not limited in this embodiment of the present invention.

Therefore, the electronic device provided in this embodiment of the present invention sets a compensation threshold according to a different operation of a user to activate the default shortcut function; or may detect, according to pressure value remaining duration, whether a real objective of the user is to implement the default shortcut function. The display may alternatively display, to the user, a graphical user interface including an icon marking the default shortcut function, so that the user resets the default shortcut function according to a requirement. This can improve user operation reliability. The pressure value is detected at an APP icon location to implement the default shortcut function. This can avoid a misoperation caused during multiple selections, can increase a speed of enabling the default shortcut function, can be used by users with different operations, and further improves user experience.

FIG. 9 shows an example of an architecture of an electronic device 500 according to an embodiment of the present invention. The electronic device 500 may include components such as an input unit 510, an output unit 520, a communications unit 530, a storage unit 540, a processing unit 550, a peripheral interface 560, and a power supply 570.

The input unit 510 may be configured to implement interaction between a user and the electronic device. For example, the input unit 510 may be configured to receive number or character information input by a user, to generate signal input related to user settings or function control. Optionally, the input unit 510 may include a touch panel, various sensing devices (for example, the sensor 430), a substantive input key, and a microphone or another external information capture apparatus, for example, a camera. The substantive input key may include but is not limited to one or more of a physical keyboard, a function key (for example, a volume control key or an on/off key), a trackball, a mouse, a joystick, or the like. The microphone may be configured to collect voice input by a user or an environment and convert the voice to a command that is in a form of an electrical signal and that can be executed by the processing unit 550. However, this is not limited in this embodiment of the present invention.

The output unit 520 may include but is not limited to an image output unit and an audio output unit. The image output unit may include a filter and an amplifier, to perform filtering and zoom-in processing on a video output by the processing unit 550. The audio output unit may include a digital-to-analog converter, to convert an audio signal, output by the processing unit 550, from a digital format to an analog format. Optionally, the image output unit may include a single display or multiple displays with different sizes, for example, the display 410 in FIG. 8. The display may be in a resistor type, a capacitor type, an infrared (Infrared), a surface acoustic wave type, or another type, for example, a liquid crystal display (Liquid Crystal Display, "LCD" for short), an organic light-emitting diode (Organic Light-Emitting Diode, "OLED" for short), an electrophoretic (Electrophoretic) display, or a display using an Interferometric Modulation of Light technology (Interferometric Modulation of Light).

Optionally, the touch panel may alternatively be used as a display. For example, after detecting a gesture operation performed on or near the touch panel, the touch panel transmits information about the gesture operation to the processing unit 550 to determine a touch event type, and then the processing unit 550 provides corresponding visual output to the display according to the touch event type. In addition, in FIG. 10, the input unit 510 and the output unit 520 are used as two independent components to implement input and output functions of the electronic device. However, in some embodiments, the input unit 510 and the output unit 520 may be integrated to implement the input and output functions of the electronic device. For example, the image output unit may display various graphical user interfaces (Graphical User Interface, "GUI" for short) as virtual control components, including but not limited to a window, a scrollbar, an icon, and a scrapbook, for a user to perform an operation by means of a touch. This is not limited in this embodiment of the present invention.

The communications unit 530 is configured to establish a communications channel, to connect the electronic device to a remote server by using the communications channel and download media data from the remote server. The communications unit 530 may include a communications module such as a wireless local area network (Wireless Local Area Network, "WLAN" for short) module, a Bluetooth module, and a baseband (BaseBand) module, and a radio frequency (Radio Frequency, "RF" for short) circuit corresponding to the communications module, to perform wireless local area network communication, Bluetooth communication, infrared communication, and/or cellular communications system communication, for example, Wideband Code Division Multiple Access (Wideband Code Division Multiple Access, "WCDMA" for short) and/or high speed downlink packet access (High Speed Downlink Packet Access, "HSDPA" for short).

The communications unit 530 may be configured to control communication between components of the electronic device, and can support direct memory access (Direct Memory Access, "DMA" for short). All communication modules of the communications unit are generally presented in a form of an integrated circuit chip (Integrated Circuit Chip), and may be selectively combined, without requiring that all the communications modules and corresponding antenna groups be included. For example, the communications unit 530 may include only a baseband chip, a radio frequency chip, and a corresponding antenna, to provide a communication function in a cellular communications system. By means of a wireless communication connection established by the communications unit 530 (for example, wireless local area network access or WCDMA), the electronic device may be connected to a cellular network (Cellular Network) or the Internet (Internet). In some optional implementations of the present invention, some communications modules of the communications unit 530, for example, the baseband module, may be integrated into the processing unit, and this is not limited in this embodiment of the present invention.

The radio frequency circuit may be configured to: receive and send information or receive and send a signal during a call, for example, receiving downlink information from a base station and transferring the downlink information to the processing unit 550, and sending uplink data to the base station. The radio frequency circuit may include a well-known circuit configured to implement these functions, including but not limited to an antenna system, a radio frequency transceiver, one or more amplifiers, a tuner, one or more oscillators, a digital signal processor, a codec (Codec) chip set, a subscriber identity module (Subscriber Identity Module, "SIM" for short) card, a memory, and the like. In addition, the radio frequency circuit may further communicate with a network and another device by means of wireless communication. Any communications standard or protocol may be used during wireless communication, including but not limited to Global System for Mobile Communications (Global System of Mobile communication, "GSM" for short), General Packet Radio Service (General Packet Radio Service, "GPRS" for short), Code Division Multiple Access (Code Division Multiple Access, "CDMA" for short), (Wideband Code Division Multiple Access, "WCDMA" for short), a High Speed Uplink Packet Access (High Speed Uplink Packet Access, "HSUPA" for short), Long Term Evolution (Long Term Evolution, "LTE" for short), and the like.

The storage unit 540 may include a data storage region and a program storage region. The program storage region is configured to store a software program (that is, at least one instruction) or module, for example, a sound playback program or an image playback program. The data storage region may be configured to store data stored in the electronic device, for example, audio data, image data, or a phonebook.

Specifically, the storage unit 540 may include a volatile memory, for example, a random access memory (Random Access Memory, "RAM" for short); or the storage unit 540 may include a non-volatile memory, for example, a non-volatile random access memory (Non-volatile Random Access Memory, "NVRAM" for short), a magneto-resistive random access memory (Magneto-resistive RAM, "MRAM" for short), a phase change random access memory (Phase Change RAM, "PRAM" for short), a magnetic disk storage device, an electrically erasable programmable read-only memory (Electrically Erasable Programmable Read-Only Memory, "EEPROM"), or a flash memory (for example, NOR flash memory (NOR flash memory) or NAND flash memory (NAND flash memory)). Specifically, the non-volatile memory may be configured to store an instruction executed by the processing unit, for example, an operating system and an application. The operating system may be used to control and manage a conventional system task (for example, memory management, storage device control, or power supply management) and various components and/or drivers conducive to communication between various software and hardware. The application may include any application installed in the electronic device, including but not limited to a browser, an email, an instant messaging service, word processing, keyboard virtualization, a widget (Widget), encryption, digital copyright management, voice recognition, voice copy, positioning (for example, a function provided by a global positioning system), music playback, or the like. This is not limited in this embodiment of the present invention.

The processing unit 550 may be configured to execute the instruction stored in the memory, to implement a corresponding function. For example, the processor 440 in the foregoing embodiment may be the processing unit 550. Optionally, the processing unit 550 may include a baseband processor and an application processor, or a baseband processor and an application processor may be integrated together. Alternatively, the processing unit may further include a subsystem including a low-power-consumption microprocessor as a core and another device (for example, an AD converter), or may become a controller.

The power supply 570 is configured to supply power to different components of the electronic device to maintain running of the electronic device. Generally, the power supply may be an embedded battery, for example, a common lithium-ion battery or a nickel-metal hydride battery, or may include an external power supply that directly supplies power to the electronic device, for example, an AC adapter. In some implementations of the present invention, the power supply may have more extensive definitions. For example, the power supply may further include a power management system, a charging system, a power supply failure detection circuit, a power converter or inverter, a power supply status indicator (for example, a light emitting diode), and any other component related to electric energy generation, management, and distribution of the electronic device.

Optionally, the output unit 520 may present an interface for the default shortcut function. The output unit 520 may present a graphical user interface corresponding to the default shortcut function. The input unit 510 receives user input, obtains a location of a marking icon, a gesture at an APP icon location, and a gesture pressure value at the APP icon location. The storage unit 540 may store related data of the sensor. The processing unit 550 may run corresponding code to process received information and generate and output a corresponding interface and corresponding data, and finally, the output unit 520 presents a current operation effect.

In this way, the sensor may sense a resistance, capacitance, or inductance change caused by a shape change during a press, and may determine a pressure change after performing signal transformation. The processing unit 550 may execute, with reference to a touch point location (or a touch point track) and the pressure change, a pressure determining related program stored in the storage unit, to determine a degree of press force and determine a program corresponding to the degree of press force. Optionally, the degree of press force may include only a light touch and a heavy press, or may be classified into multiple different levels according to sensitivity of the sensor. Finally, the processing unit may present a processing result to a user by using the display.

Figure 10:
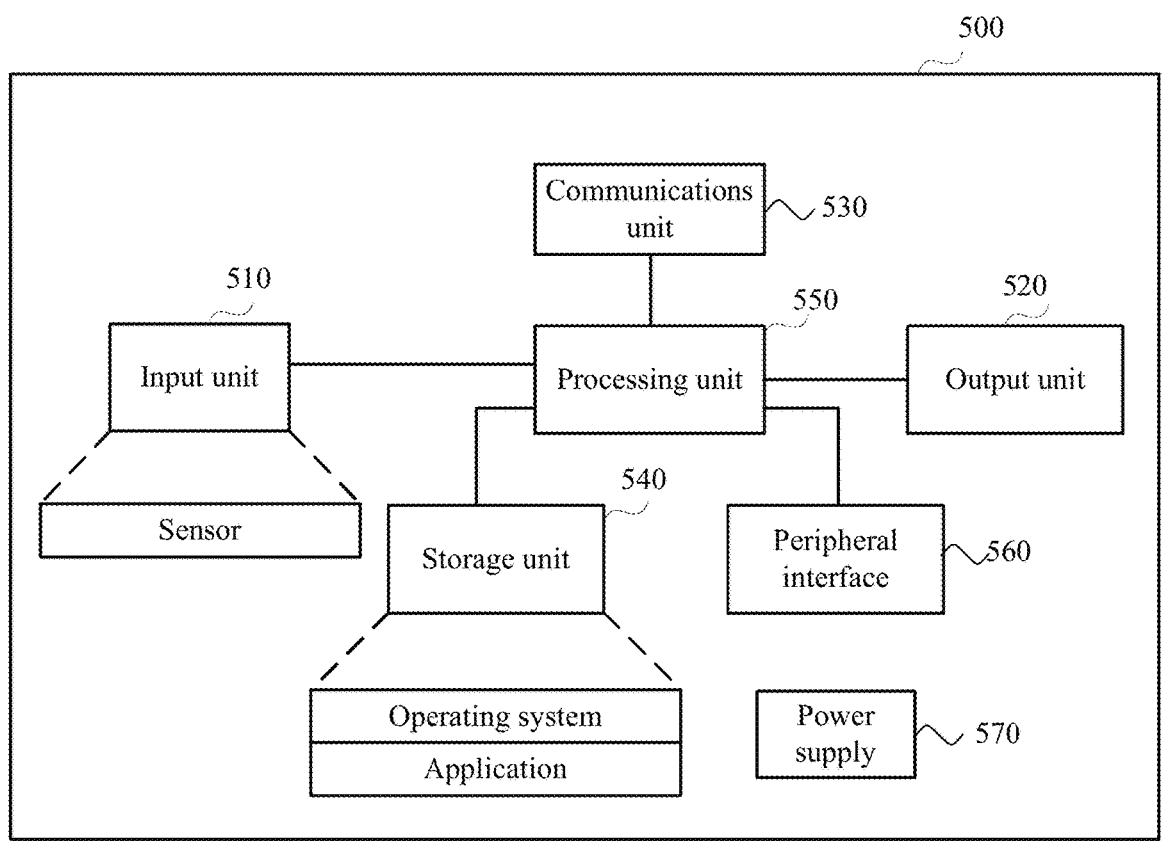
FIG. 10 is a schematic diagram of another electronic device according to an embodiment of the present invention.

It should be noted that the example in FIG. 10 is intended to help a person skilled in the art to better understand this embodiment of the present invention instead of limiting the scope of this embodiment of the present invention. Obviously, a person skilled in the art can make various equivalent modifications and variations to the examples in FIG. 9. Such modifications and variations also fall within the scope of this embodiment of the present invention.

The foregoing describes in detail the electronic device in the embodiments of the present invention with reference to FIG. 9 and FIG. 10. The following describes in detail a graphical user interface on an electronic device according to an embodiment of the present invention.

An embodiment of the present invention provides a graphical user interface on an electronic device. The electronic device has a display, a pressure-sensitive surface, a memory, one or more sensors configured to detect strength of a touch with the pressure-sensitive surface, and one or more processors configured to execute one or more programs stored in the memory. For example, the electronic device may be the electronic device in FIG. 9 or FIG. 10. The graphical user interface includes at least one icon. At least one shortcut function is preset for a first software program marked by a first icon of the at least one icon, so as to: respond to first pressure input detected on the pressure-sensitive surface, where for the first pressure input, when strength of a contact corresponding to the first icon increases to meet a first preset condition, at least one shortcut function preset for the first icon is displayed, as shown in FIG. 5(*a*) or FIG. 6(*b*); and respond to second pressure input that is after the first pressure input detected on the pressure-sensitive surface, where for the second pressure input, when the strength of the contact corresponding to the first icon meets a second preset condition, an interface corresponding to a default shortcut function of the at least one shortcut function is displayed, as shown in FIG. 5(*c*), FIG. 6(*e*), or FIG. 7(*b*). The icon may be an application APP icon, or may be a folder icon.

The first preset condition may be as follows: The electronic device determines that a pressure value of the first pressure input reaches a first threshold within a first preset time period, or the electronic device determines that a pressure value of the first pressure input falls within a range from a third threshold to a first threshold for at least two times within a first preset time period, or when determining whether a pressure value of the first pressure input is greater than or equal to a second threshold, the electronic device determines that the pressure value of the first pressure input is greater than or equal to the second threshold, where the second threshold is greater than the first threshold. The second preset condition may be as follows: The electronic device detects that the pressure value of the second pressure input reaches a second threshold within the first preset time period; or when the electronic device detects that the pressure value of the second pressure input reaches the second threshold within the first preset time period, the electronic device continues to detect that the pressure value of the second pressure input exerted on the first icon within the second preset time period, and the electronic device determines that the detected pressure value of the second pressure input is always greater than or equal to the second threshold within the second preset time period; or the electronic device detects that the pressure value of the second pressure input reaches a fourth threshold; or after detecting that the pressure value of the second pressure input is greater than or equal to a fifth threshold and less than the fourth threshold, when determining whether the pressure value of the second pressure input exerted on the first icon is always greater than or equal to the fifth threshold and less than the fourth threshold within a subsequent third preset time period, the electronic device determines that the pressure value of the second pressure input exerted on the first icon is always greater than or equal to the fifth threshold and less than the fourth threshold within the third preset time period; or the electronic device determines that a pressure value of the second pressure input falls within a range from the third threshold to the first threshold for at least two times and that a time interval between the at least two times meets a preset dual-pressure time condition.

In this way, the man-machine interaction interface can be presented to the user intuitively. This increases a speed of enabling the default shortcut function and further improves user experience.

It should be understood that the first preset condition may be as follows: Within a preset time period, the pressure value of the first pressure input is greater than a particular threshold or falls within a particular threshold range for at least two times. The second preset condition may be as follows: The pressure value of the second pressure input is greater than a preset threshold or remains in a preset threshold range for a preset time period. Certainly, the first preset condition and the second preset condition may be other conditions related to the pressure value. For example, a maximum pressure value of the first pressure input within a preset time period is greater than a particular threshold, or an average pressure value of the first pressure input within a preset time period is greater than a particular threshold, or a pressure value of the first pressure input reaches a crest and a trough for at least one time within a preset time period. For another example, the pressure value of the second pressure input reaches a specified threshold after remaining for a preset time period, or the pressure value of the second pressure input reaches a specified threshold and remains for a preset time period; or after the pressure value of the second pressure input reaches a specified first threshold, the pressure value of the second pressure input remains in a range from a second threshold to the first threshold for a specified time period, or the pressure value of the second pressure input may fall within a preset threshold range for at least two times. No limitation is imposed on the first preset condition and the second preset condition in this embodiment of the present invention.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads instructions in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may be not physically separate, and parts displayed as units may or may be not physical units, may be located in one position, or may be distributed on a plurality of network units. Some or all of the units may be selected according to actual needs to achieve the objectives of the solutions in the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A man-machine interaction method, applied to an electronic device having a display and a pressure-sensitive surface, wherein the electronic device comprises one or more sensors that detect strength of a touch on the pressure-sensitive surface, the method comprising:
  displaying, by the electronic device on a home-screen interface of the display, a folder icon for a folder that includes a plurality of applications, wherein a plurality of shortcut functions are preset for the folder;
  detecting, by the electronic device, a first touch input exerted on the folder icon;
  determining, by the electronic device, information about the plurality of shortcut functions when determining that the first touch input is greater than a first threshold, the information about the plurality of shortcut functions comprising a list of indications representing the plurality of shortcut functions for the folder icon, each indication of the list representing one of the plurality of shortcut functions;
  upon determining that the first touch input is greater than the first threshold, displaying, by the electronic device, together with the folder icon, the list of indications representing the plurality of shortcut functions for the folder icon;
  displaying, by the electronic device, a mark for a particular indication of the list of indications, as displayed, to identify the shortcut function associated with the particular indication as a default shortcut function of the plurality of shortcut functions represented in the list, so that display of the particular indication representing the default shortcut function is different from display of indications representing other shortcut functions of the plurality of shortcut functions displayed in the list;
  continuing, by the electronic device after detecting the first touch input, to detect a second touch input exerted on the folder icon without lifting of the first touch input from the folder icon prior to the second touch input; and
  activating the default shortcut function when the electronic device determines that the second touch input is greater than a second threshold, wherein the default shortcut function comprises launching a particular application of the plurality of applications included in the folder, such that activating the default shortcut function comprises launching the particular application of the plurality of applications.

2. The method according to claim 1, wherein determining, by the electronic device, the information about the plurality of shortcut functions when determining that the first touch input is greater than the first threshold comprises:
  determining the information about the plurality of shortcut functions when the electronic device determines that a pressure value of the first touch input reaches the first threshold within a first preset time period, wherein
  the first preset time period is a time interval between a first time point and a second time point, and the first time point is a time at which the electronic device starts to detect the pressure value of the first touch input exerted on the folder icon.

3. The method according to claim 2, wherein activating the default shortcut function when the electronic device determines that the second touch input is greater than the second threshold comprises:
  activating the default shortcut function when the electronic device detects that a pressure value of the second touch input reaches a fourth threshold, wherein
  the fourth threshold is greater than the first threshold.

4. The method according to claim 3, wherein activating the default shortcut function when the electronic device determines that the second touch input is greater than the second threshold comprises:
  when the electronic device detects that the pressure value of the second operation touch input is greater than or equal to a fifth threshold and less than the fourth threshold,
    determining, by the electronic device, whether the pressure value of the second touch input exerted on the folder icon is always greater than or equal to the fifth threshold and less than the fourth threshold within a subsequent third preset time period; and
    activating the default shortcut function if the pressure value of the second touch input exerted on the folder icon is always greater than or equal to the fifth threshold and less than the fourth threshold within the third preset time period, wherein
  the fourth threshold is greater than the fifth threshold and the fifth threshold is greater than the first threshold.

5. The method according to claim 2, wherein activating the default shortcut function when the electronic device determines that the second touch input is greater than the second threshold comprises:
  activating the default shortcut function when the electronic device determines that a pressure value of the second touch input falls within a range from a third threshold to the first threshold for at least two times and that a time interval between the at least two times meets a preset dual-pressure time condition, wherein
  the first threshold is greater than the third threshold.

6. The method according to claim 2, wherein activating the default shortcut function when the electronic device determines that the second touch input is greater than the second threshold comprises:
 continuing, by the electronic device, to detect the pressure value of the second touch input when the electronic device determines that a pressure value of the second operation touch input is less than a sixth threshold; and
 activating the default shortcut function when the electronic device determines that the pressure value of the second touch input reaches a seventh threshold, wherein
 the sixth threshold is less than the first threshold, and the seventh threshold is greater than the first threshold.

7. The method according to claim 1, wherein determining, by the electronic device, the information about the plurality of shortcut functions when determining that the first touch input is greater than the first threshold comprises:
 determining the information about the plurality of shortcut functions when the electronic device determines that a pressure value of the first touch input falls within a range from a third threshold to the first threshold for at least two times within a first preset time period, wherein
 the first preset time period is a time interval between a first time point and a second time point, the first time point is a time at which the electronic device starts to detect the pressure value of the first touch input exerted on the folder icon, and the first threshold is greater than the third threshold.

8. The method according to claim 2, wherein activating the default shortcut function when the electronic device determines that the second touch input is greater than the second threshold comprises:
 activating the default shortcut function of the plurality of shortcut functions when the electronic device detects that a pressure value of the second touch input reaches the second threshold within the first preset time period, wherein
 the second threshold is greater than the first threshold.

9. The method according to claim 8, wherein activating the default shortcut function when the electronic device detects that the pressure value of the second touch input reaches the second threshold within the first preset time period comprises:
 continuing, by the electronic device when the electronic device detects that the pressure value of the second touch input reaches the second threshold within the first preset time period, to detect the pressure value of the second touch input exerted on the folder icon within a second preset time period; and
 activating the default shortcut function when the electronic device determines that the detected pressure value of the second touch input is always greater than or equal to the second threshold within the second preset time period, wherein
 the second preset time period is a time interval between a third time point and a fourth time point, and the third time point is a time at which the pressure value of the second touch input reaches the second threshold.

10. The method according to claim 1, wherein:
 determining, by the electronic device, the information about the plurality of shortcut functions when determining that the first touch input is greater than the first threshold comprises determining, by the electronic device, whether a pressure value of the first touch input is greater than or equal to the second threshold, and determining the information about the plurality of shortcut functions if the pressure value of the first touch input is greater than or equal to the second threshold; and
 activating the default shortcut function when the electronic device determines that the second touch input is greater than the second threshold comprises determining, by the electronic device, whether a pressure value of the second touch input is always greater than or equal to the second threshold within a fourth preset time period, and activating the default shortcut function of the plurality of shortcut functions if the pressure value of the second touch input exerted on the folder icon is always greater than or equal to the second threshold within the fourth preset time period.

11. The method according to claim 1, wherein displaying the mark for the particular indication of the list of indications:
 adding, by the electronic device, a marking icon only to the particular indication representing the default shortcut function; and
 after displaying, by the electronic device, the list of indications representing the plurality of shortcut functions for the folder icon, the method further comprises:
 when the electronic device detects that a user changes a location of the marking icon, determining a shortcut function corresponding to a changed location of the marking icon as the default shortcut function.

12. An electronic device, comprising:
 a display configured to display, on a home screen interface of the display, a folder icon for a folder that includes a plurality of applications, wherein a plurality of shortcut functions are preset for the folder;
 a pressure-sensitive surface;
 a sensor configured to detect, on the pressure-sensitive surface, touch input exerted on the folder icon; and
 a processor configured to:
 determine information about the plurality of shortcut functions when determining that a first touch input detected by the sensor is greater than a first threshold, the information about the plurality of shortcut functions comprising a list of indications representing the plurality of shortcut functions for the folder icon, each indication of the list representing one of the plurality of shortcut functions;
 upon determining that the first touch input is greater than the first threshold, display, together with the folder icon, the list of indications representing the plurality of shortcut functions for the folder icon;
 display, by the electronic device, a mark for a particular indication of the list of indications, as displayed, to identify the shortcut function associated with the particular indication as a default shortcut function of the plurality of shortcut functions represented in the list, so that display of the particular indication representing the default shortcut function is different from display of indications representing other shortcut functions of the plurality of shortcut functions displayed in the list; and
 activate the default shortcut function when determining that a second touch input is greater than a second threshold, wherein the second touch input is a touch input that is exerted on the folder icon without lifting of the first touch input from the folder icon prior to the second touch input and that is detected by the sensor, wherein the default shortcut function comprises launching a particular application of the plurality of applications included in the folder, such that activating the default shortcut function comprises launching the particular application of the plurality of applications.

13. The electronic device according to claim 12, wherein the processor is configured to:
determine the information about the plurality of shortcut functions when a pressure value of the first touch input reaches the first threshold within a first preset time period, wherein
the first preset time period is a time interval between a first time point and a second time point, and the first time point is a time at which the sensor starts to detect the pressure value of the first touch input exerted on the folder icon.

14. The electronic device according to claim 13, wherein the processor is further configured to:
activate the default shortcut function of the plurality of shortcut functions when the sensor detects that a pressure value of the second touch input reaches the second threshold within the first preset time period, wherein
the second threshold is greater than the first threshold.

15. The electronic device according to claim 14, wherein the processor is configured to: when the sensor detects that the pressure value of the second touch input reaches the second threshold within the first preset time period, continue to detect the pressure value of the second touch input exerted on the folder icon within a second preset time period; and activate the default shortcut function when determining that the pressure value of the second touch input detected by the sensor is always greater than or equal to the second threshold within the second preset time period, wherein
the second preset time period is a time interval between a third time point and a fourth time point, and the third time point is a time at which the pressure value of the second touch input reaches the second threshold.

16. The electronic device according to claim 13, wherein the processor is further configured to:
activate the default shortcut function when detecting that the pressure value of the second touch input reaches a fourth threshold, wherein
the fourth threshold is greater than the first threshold.

17. The electronic device according to claim 16, wherein the processor is further configured to:
when detecting that the pressure value of the second touch input is greater than or equal to a fifth threshold and less than the fourth threshold,
determine whether the pressure value of the second touch input exerted on the folder icon is always greater than or equal to the fifth threshold and less than the fourth threshold within a subsequent third preset time period; and activate the default shortcut function if the pressure value of the second touch input exerted on the folder icon is always greater than or equal to the fifth threshold and less than the fourth threshold within the third preset time period, wherein
the fourth threshold is greater than the fifth threshold and the fifth threshold is greater than the first threshold.

18. The electronic device according to claim 13, wherein the processor is further configured to:
activate the default shortcut function when the electronic device determines that a pressure value of the second touch input falls within a range from a third threshold to the first threshold for at least two times and that a time interval between the at least two times meets a preset dual-pressure time condition, wherein
the first threshold is greater than the third threshold.

19. The electronic device according to claim 13, wherein the processor is further configured to: when determining that the pressure value of the second touch input is less than a sixth threshold, continue to determine the pressure value of the second touch input detected by the sensor; and activate the default shortcut function when determining that the pressure value of the second touch input reaches a seventh threshold, wherein
the sixth threshold is less than the first threshold, and the seventh threshold is greater than the first threshold.

20. The electronic device according to claim 12, wherein the processor is further configured to:
determine the information about the plurality of shortcut functions when determining that a pressure value of the first touch input falls within a range from a third threshold to the first threshold for at least two times within a first preset time period, wherein
the first preset time period is a time interval between a first time point and a second time point, the first time point is a time at which the sensor starts to detect the pressure value of the first touch input exerted on the folder icon, and the first threshold is greater than the third threshold.

21. The electronic device according to claim 12, wherein the processor is further configured to:
determine whether a pressure value of the first touch input is greater than or equal to the second threshold, and determine the information about the plurality of shortcut functions if the pressure value of the first touch input is greater than or equal to the second threshold; and
determine whether a pressure value of the second touch input is always greater than or equal to the second threshold within a fourth preset time period, and activate the default shortcut function if the pressure value of the second touch input exerted on the folder icon is always greater than or equal to the second threshold within the fourth preset time period.

\* \* \* \* \*

UNITED STATES PATENT AND TRADEMARK OFFICE
CERTIFICATE OF CORRECTION

PATENT NO. : 10,983,624 B2
APPLICATION NO. : 16/085491
DATED : April 20, 2021
INVENTOR(S) : Jie Xu et al.

Page 1 of 1

It is certified that error appears in the above-identified patent and that said Letters Patent is hereby corrected as shown below:

In the Claims

In Column 36, Line 41, Claim 4, delete "operation".

In Column 37, Line 8, Claim 6, delete "operation".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*